(12) United States Patent
Chun et al.

(10) Patent No.: US 9,220,096 B2
(45) Date of Patent: Dec. 22, 2015

(54) METHOD AND DEVICE FOR DOWNLINK CONTROL CHANNEL ALLOCATION IN WIRELESS COMMUNICATION SYSTEM

(75) Inventors: Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR); Sung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 16 days.

(21) Appl. No.: 14/128,484

(22) PCT Filed: Jun. 27, 2012

(86) PCT No.: PCT/KR2012/005064
§ 371 (c)(1),
(2), (4) Date: Dec. 20, 2013

(87) PCT Pub. No.: WO2013/002544
PCT Pub. Date: Jan. 3, 2013

(65) Prior Publication Data
US 2014/0112290 A1    Apr. 24, 2014

Related U.S. Application Data

(60) Provisional application No. 61/507,612, filed on Jul. 14, 2011, provisional application No. 61/506,657, filed on Jul. 12, 2011, provisional application No. 61/501,264, filed on Jun. 27, 2011.

(51) Int. Cl.
*H04W 4/00* (2009.01)
*H04W 72/04* (2009.01)
*H04L 5/00* (2006.01)

(52) U.S. Cl.
CPC ............... *H04W 72/042* (2013.01); *H04L 5/00* (2013.01); *H04W 72/0446* (2013.01)

(58) Field of Classification Search
CPC ..... H04W 72/00; H04W 72/02; H04W 72/04; H04W 72/042; H04W 72/0446; H04W 72/12; H04W 72/0453; H04L 45/00
See application file for complete search history.

(56) References Cited

U.S. PATENT DOCUMENTS

2010/0165847 A1    7/2010  Kamuf et al.
2011/0170496 A1*   7/2011  Fong et al. .................... 370/329

FOREIGN PATENT DOCUMENTS

| KR | 10-2011-0007986 A | 1/2011 |
| KR | 10-2011-00434493 A | 4/2011 |
| WO | 2010053984 A2 | 5/2010 |

OTHER PUBLICATIONS

3GPP R1-111661, "PDCCH Enhancement Considerations", Research in Motion, UK Limited, 3GPP TSG RAN WG1 Meeting #65, May 9-13, 2011 See the entire document.

* cited by examiner

*Primary Examiner* — Anh Ngoc Nguyen
(74) *Attorney, Agent, or Firm* — Dentons US LLP

(57) ABSTRACT

Provided are a method and device for downlink control channel allocation in a wireless communication system. A base station allocates e-PDCCH (enhanced physical downlink control channel) to one slot in a subframe, and transmits a DMRS (demodulation reference signal) after allocating the DMRS to one of the slots for the e-PDCCH.

12 Claims, 28 Drawing Sheets

FIG. 23
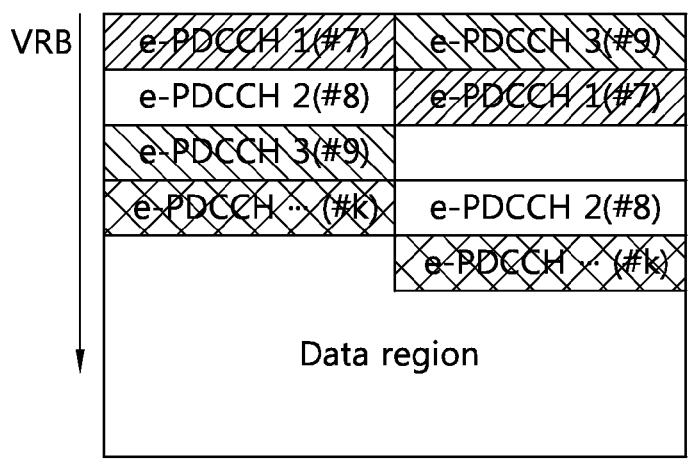
(a)
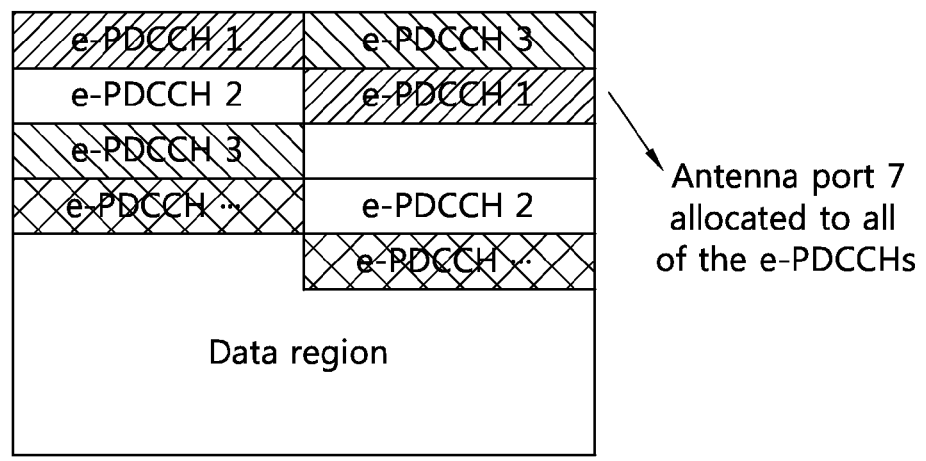
(b)

METHOD AND DEVICE FOR DOWNLINK CONTROL CHANNEL ALLOCATION IN WIRELESS COMMUNICATION SYSTEM

This application is a 35 USC §371 National Stage entry of International Application No. PCT/KR2012/005064 filed on Jun. 27, 2012, and claims priority of U.S. Provisional Application No. 61/501,264 filed on Jun. 27, 2011, 61/506,657, filed Jul. 12, 2011, and 61/507,612, filed Jul. 14, 2011, each of which is hereby incorporated by reference in its entirety.

BACKGROUND OF THE INVENTION

1. Field of the Invention

The present invention relates to wireless communications and more particularly, a method and apparatus for allocating a downlink control channel in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, inter-symbol interference (ISI), and the Doppler Effect resulting from the mobility of a user equipment. A variety of techniques are being developed in order to overcome the abnormal characteristics of the wireless channel and to increase the reliability of wireless communication.

Meanwhile, with the employment of machine-to-machine (M2M) communication and with the introduction and distribution of various devices such as a smart phone, a table personal computer (PC), etc., a data requirement size for a cellular network is increased rapidly. To satisfy a high data requirement size, various techniques are under development. A carrier aggregation (CA) technique, a cognitive radio (CR) technique, or the like for effectively using more frequency bands are under research. In addition, a multiple antenna technique, a multiple base station cooperation technique, or the like for increasing data capacity within a limited frequency are under research. That is, eventually, the wireless communication system will be evolved in a direction of increasing density of nodes capable of accessing to an area around a user. A wireless communication system having nodes with higher density can provide a higher performance through cooperation between the nodes. That is, a wireless communication system in which each node cooperates has a much higher performance than a wireless communication system in which each node operates as an independent base station (BS), advanced BS (ABS), node-B (NB), eNode-B (eNB), access point (AP), etc.

A distributed multi-node system (DMNS) comprising a plurality of nodes within a cell may be used to improve performance of a wireless communication system. The DMNS may include a distributed antenna system (DAS), a radio remote head (RRH), and so on. Also, standardization work is underway for various multiple-input multiple-output (MIMO) techniques and cooperative communication techniques already developed or applicable in a future so that they can be applied to the DMNS. Link quality is expected to be improved by employing the DMNS. However, introduction of a new control channel is also required for application of various MIMO techniques and cooperative techniques to the DMNS.

Accordingly, a method for allocating a new control channel for the DMNS efficiently is required. In addition, a method or allocating antenna ports for decoding the new control channel to a user equipment (UE) efficiently is required.

SUMMARY OF THE INVENTION

The present invention provides a method and apparatus for allocating a downlink control channel in a wireless communication system. The present invention provides a method for allocating an enhanced physical downlink control channel (e-PDCCH) to one slot in a subframe. Also, the present invention provides a method for allocating an antenna port, to which the e-PDCCH can be transmitted, to a user equipment (UE).

In an aspect, a method for allocating, by a base station, a downlink control channel in a wireless communication system is provided. The method includes allocating an enhanced physical downlink control channel (e-PDCCH) to one slot in a subframe, and allocating a demodulation reference signal (DMRS) for the e-PDCCH to the one slot and transmitting the allocated DMRS.

The method may further include allocating the DMRS for the e-PDCCH to a first slot of the subframe and transmitting the allocated DMRS. The one slot may be a second slot of the subframe.

The method may further include allocating a physical downlink shared channel (PDSCH) to a first slot of the subframe.

The method may further include allocating the DMRS for the e-PDCCH to a second slot of a previous subframe of the subframe and transmitting the allocated DMRS. The one slot may be a first slot of the subframe.

The method may further include allocating a PDSCH to a second slot of the previous subframe.

The DMRS may be allocated to the last two orthogonal frequency division multiplexing (OFDM) symbols of the one slot.

In another aspect, a method for allocating, by a base station, an antenna port in a wireless communication system is provided. The method includes allocating an enhanced physical downlink control channel (e-PDCCH) to a data region in a resource block (RB), allocating at least one antenna port for transmission of the e-PDCCH, and transmitting the allocated e-PDCCH to the UE through one antenna port from the at least one antenna port.

The e-PDCCH may be allocated to a first slot of a first RB and a second slot of a second RB which occupies a different frequency region from a frequency region of the first RB.

The method may further include transmitting a demodulation reference signal (DMRS) for decoding the e-PDCCH in a second slot of the first RB through the one antenna port.

The e-PDCCH may be allocated to a first and a second slot of one RB.

The at least one antenna port may be pre-determined or informed to the UE through a higher layer.

In another aspect, a method for receiving, by a user equipment (UE), a downlink control channel in a wireless communication system is provided. The method includes allocating an enhanced physical downlink control channel (e-PDCCH) to a data region in a resource block (RB), and receiving the e-PDCCH and a demodulation reference signal (DMRS) through an antenna port allocated by a base station.

The e-PDCCH may be allocated to a first slot of a first RB and a second slot of a second RB which occupies a different frequency region from a frequency region of the first RB.

The e-PDCCH may be allocated to a first and a second slot of one RB.

The antenna port may be selected by a base station among a plurality of antenna ports allocated by the base station.

An e-PDCCH for a multi-node system can be allocated efficiently.

BRIEF DESCRIPTION OF THE DRAWINGS

FIG. 23 shows another example where an antenna port meant for an e-PDCCH is allocated according to a proposed method for allocating an antenna port.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). $3^{rd}$ generation partnership project (3GPP) long term evolution (LTE) is part of an evolved UMTS (E-UMTS) using the E-UTRA, which employs the OFDMA in downlink and the SC-FDMA in uplink. LTE-advanced (LTE-A) is an evolution of 3GPP LTE.

Hereinafter, for clarification, LTE-A will be largely described, but the technical concept of the present invention is not meant to be limited thereto.

Figure 1:
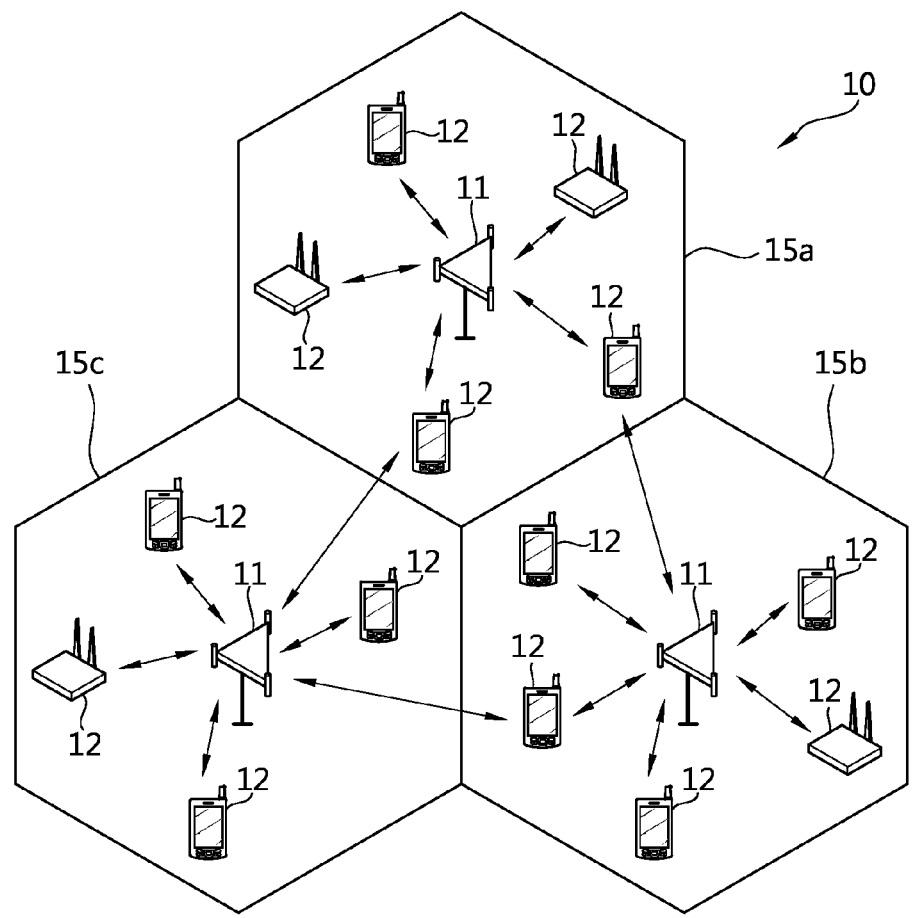
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile user equipment (MT), user user equipment (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
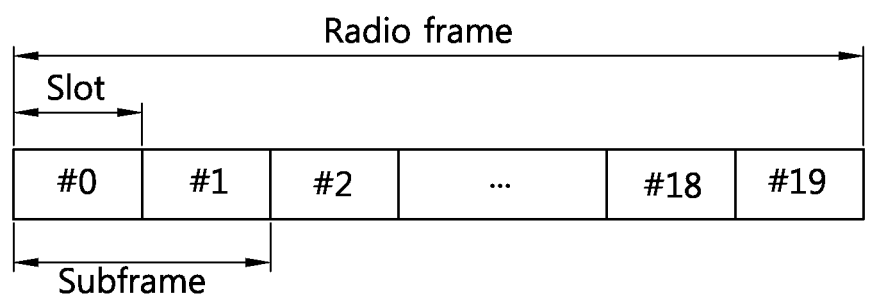
FIG. 2 shows a structure of a radio frame in 3GPP LTE.

FIG. 2 shows a structure of a radio frame in 3GPP LTE.

It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03). Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
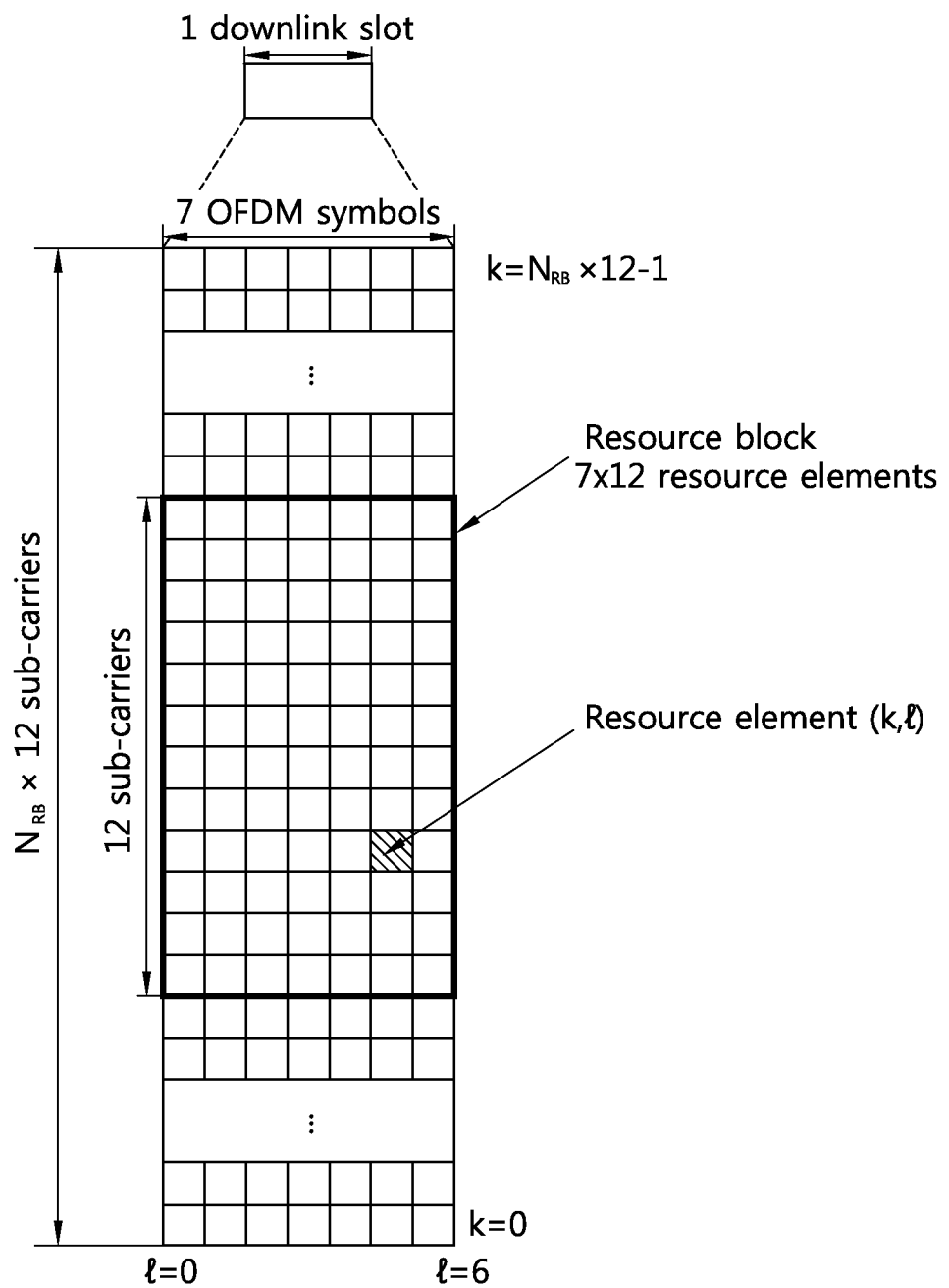
FIG. 3 shows an example of a resource grid of a single downlink slot.

FIG. 3 shows an example of a resource grid of a single downlink slot.

A downlink slot includes a plurality of OFDM symbols in the time domain and $N_{RB}$ number of resource blocks (RBs) in the frequency domain. The $N_{RB}$ number of resource blocks included in the downlink slot is dependent upon a downlink transmission bandwidth set in a cell. For example, in an LTE system, $N_{RB}$ may be any one of 6 to 110. One resource block includes a plurality of subcarriers in the frequency domain. An uplink slot may have the same structure as that of the downlink slot.

Each element on the resource grid is called a resource element. The resource elements on the resource grid can be identified by a pair of indexes (k,l) in the slot. Here, k (k=0, . . . , $N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
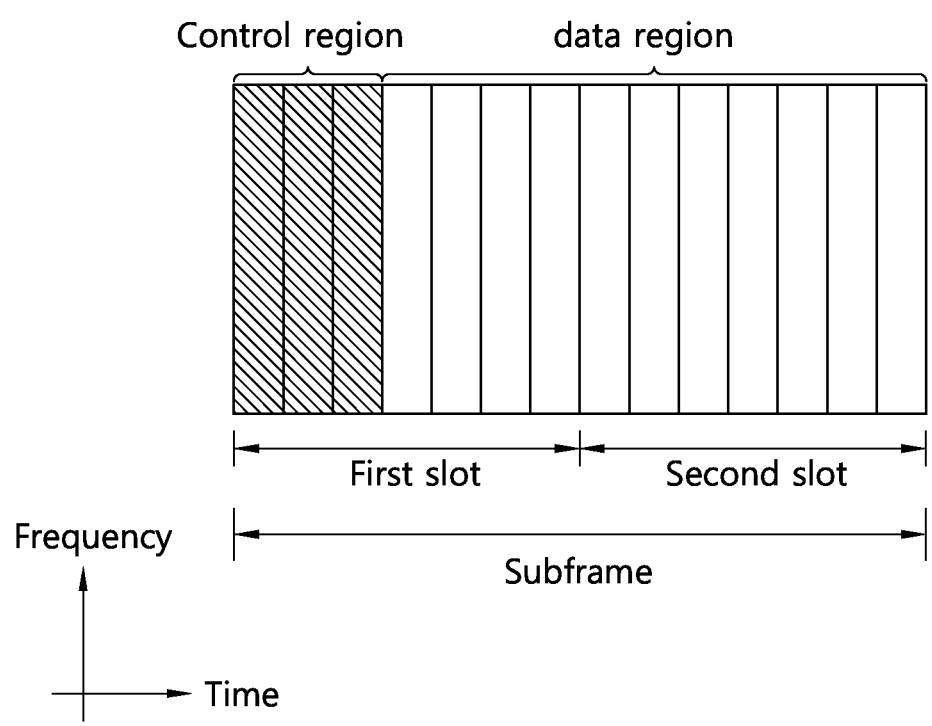
FIG. 4 shows a structure of a downlink subframe.

FIG. 4 shows a structure of a downlink subframe.

A downlink subframe includes two slots in the time domain, and each of the slots includes seven OFDM symbols in the normal CP. First three OFDM symbols (maximum four OFDM symbols for a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCE corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
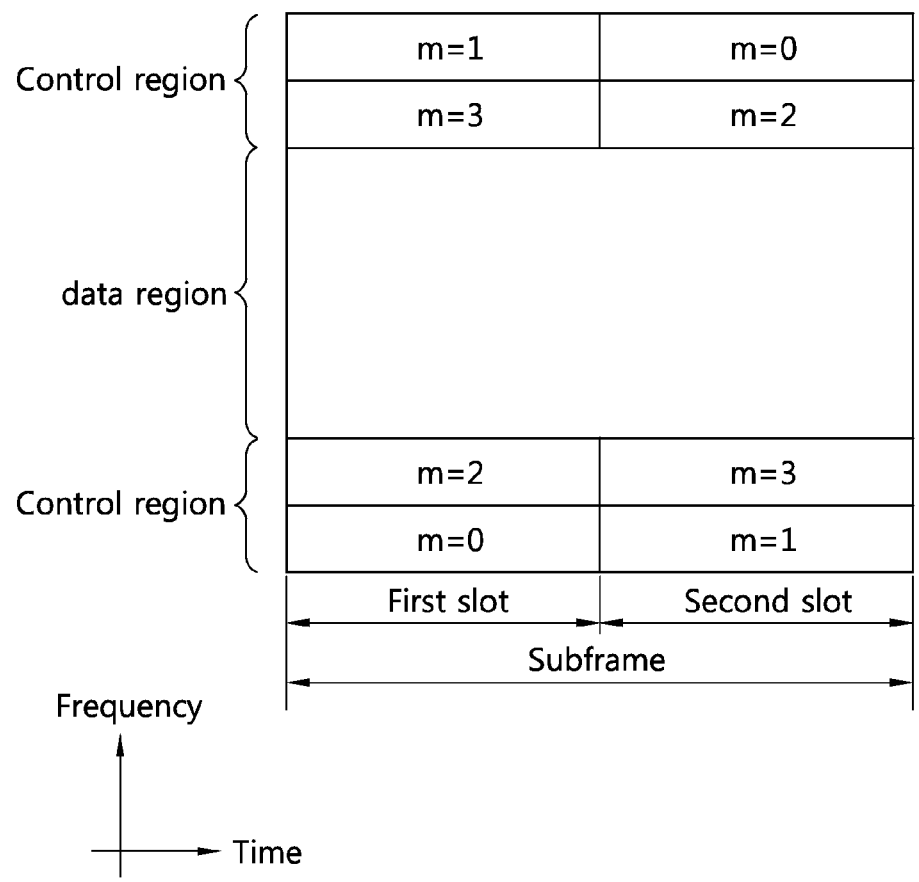
FIG. 5 shows a structure of an uplink subframe.

FIG. 5 shows a structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. When indicated by a higher layer, the UE may support a simultaneous transmission of the PUSCH and the PUCCH.

The PUCCH for a UE is allocated by a pair of RBs in a subframe. The resource blocks belonging to the pair of RBs occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

To improve a performance of the wireless communication system, a technique is evolved in a direction of increasing density of nodes capable of accessing to an area around a user. A wireless communication system having nodes with higher density can provide a higher performance through cooperation between the nodes.

Figure 6:
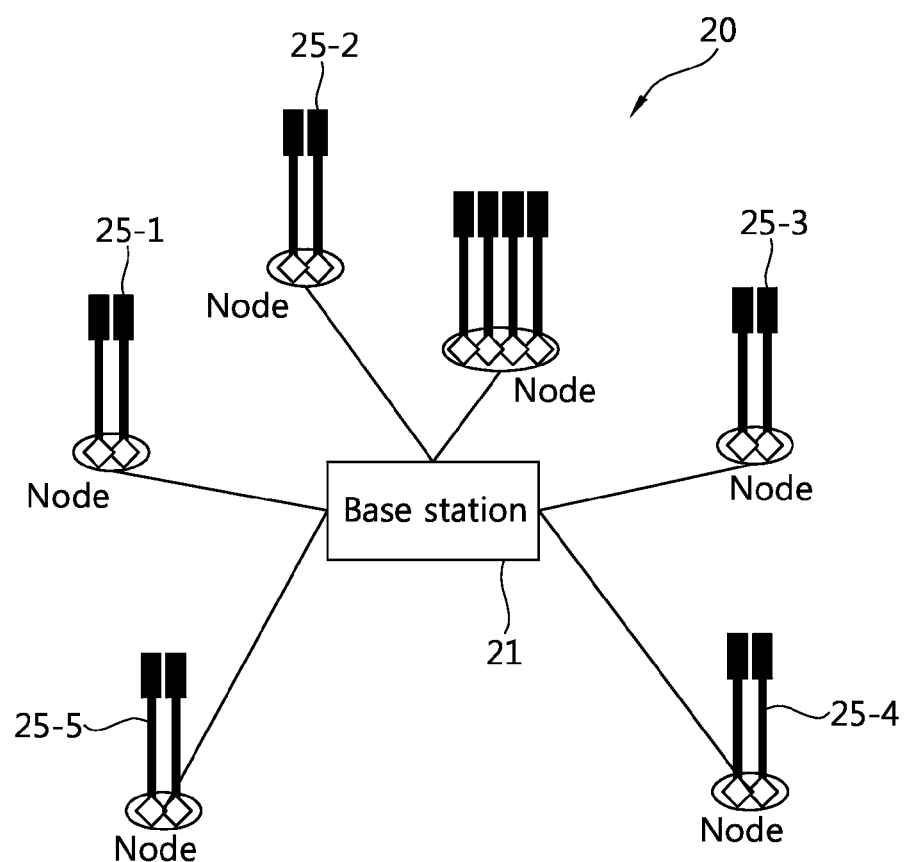
FIG. 6 shows an example of a multi-node system.

FIG. 6 shows an example of a multi-node system.

Referring to FIG. 6, a multi-node system 20 may consist of one BS 21 and a plurality of nodes 25-1, 25-2, 25-3, 25-4, and 25-5. The plurality of nodes 25-1, 25-2, 25-3, 25-4, and 25-5 may be managed by one BS 21. That is, the plurality of nodes 25-1, 25-2, 25-3, 25-4, and 25-5 operate as if they are a part of one cell. In this case, each of the nodes 25-1, 25-2, 25-3, 25-4, and 25-5 may be allocated a separate node identifier (ID), or may operate as if it is a part of an antenna group without an additional node ID. In this case, the multi-node system 20 of FIG. 6 may be regarded as a distributed multi node system (DMNS) which constitutes one cell.

Alternatively, the plurality of nodes 25-1, 25-2, 25-3, 25-4, and 25-5 may have separate cell IDs and perform a handover (HO) and scheduling of the UE. In this case, the multi-node system 20 of FIG. 6 may be regarded as a multi-cell system. The BS 21 may be a macro cell. Each node may be a femto cell or pico cell having cell coverage smaller than cell coverage of a macro cell. As such, if a plurality of cells is configured in an overlaid manner according to coverage, it may be called a multi-tier network.

In FIG. 6, each of the nodes 25-1, 25-2, 25-3, 25-4, and 25-5 may be any one of a BS, a Node-B, an eNode-B, a pico cell eNB (PeNB), a home eNB (HeNB), a remote radio head (RRH), a relay station (RS) or repeater, and a distributed antenna. At least one antenna may be installed in one node. In addition, the node may be called a point. In the following descriptions, a node implies an antenna group separated by more than a specific interval in a DMNS. That is, it is assumed in the following descriptions that each node implies an RRH in a physical manner. However, the present invention is not limited thereto, and the node may be defined as any antenna group irrespective of a physical interval. For example, the present invention may be applied by considering that a node consisting of horizontal polarized antennas and a node consisting of vertical polarized antennas constitute a BS consisting of a plurality of cross polarized antennas. In addition, the present invention may be applied to a case where each node is a pico cell or femto cell having smaller cell coverage than a macro cell, that is, to a multi-cell system. In the following descriptions, an antenna may be replaced with an antenna port, virtual antenna, antenna group, as well as a physical antenna.

First of all, a reference signal (RS) is described.

In general, a reference signal (RS) is transmitted as a sequence. Any sequence may be used as a sequence used for an RS sequence without particular restrictions. The RS sequence may be a phase shift keying (PSK)-based computer generated sequence. Examples of the PSK include binary phase shift keying (BPSK), quadrature phase shift keying (QPSK), etc. Alternatively, the RS sequence may be a constant amplitude zero auto-correlation (CAZAC) sequence. Examples of the CAZAC sequence include a Zadoff-Chu (ZC)-based sequence, a ZC sequence with cyclic extension, a ZC sequence with truncation, etc. Alternatively, the RS sequence may be a pseudo-random (PN) sequence. Examples of the PN sequence include an m-sequence, a computer generated sequence, a Gold sequence, a Kasami sequence, etc. In addition, the RS sequence may be a cyclically shifted sequence.

A downlink RS may be classified into a cell-specific reference signal (CRS), a multimedia broadcast and multicast single frequency network (MBSFN) reference signal, a UE-specific reference signal, a positioning reference signal (PRS), and a channel state information reference signal (CS-RS). The CRS is an RS transmitted to all UEs in a cell, and is used in channel measurement for a channel quality indicator (CQI) feedback and channel estimation for a PDSCH. The MBSFN reference signal may be transmitted in a subframe allocated for MBSFN transmission. The UE-specific RS is an RS received by a specific UE or a specific UE group in the cell, and may also be called a demodulation reference signal (DMRS). The DMRS is primarily used for data demodulation of a specific UE or a specific UE group. The PRS may be used for location estimation of the UE. The CSI RS is used for channel estimation for a PDSCH of a LTE-A UE. The CSI RS is relatively sparsely deployed in a frequency domain or a time domain, and may be punctured in a data region of a normal subframe or an MBSFN subframe. If required, a channel quality indicator (CQI), a precoding matrix indicator (PMI), a rank indicator (RI), etc., may be reported from the UE through CSI estimation.

A CRS is transmitted from all of downlink subframes within a cell supporting PDSCH transmission. The CRS may be transmitted through antenna ports 0 to 3 and may be defined only for $\Delta f=15$ kHz. The CRS may be referred to Section 6.10.1 of $3^{rd}$ generation partnership project (3GPP) TS 36.211 V10.1.0 (2011-03) "Technical Specification Group Radio Access Network: Evolved Universal Terrestrial Radio Access (E-UTRA): Physical channels and modulation (Release 8)".

Figure 7:
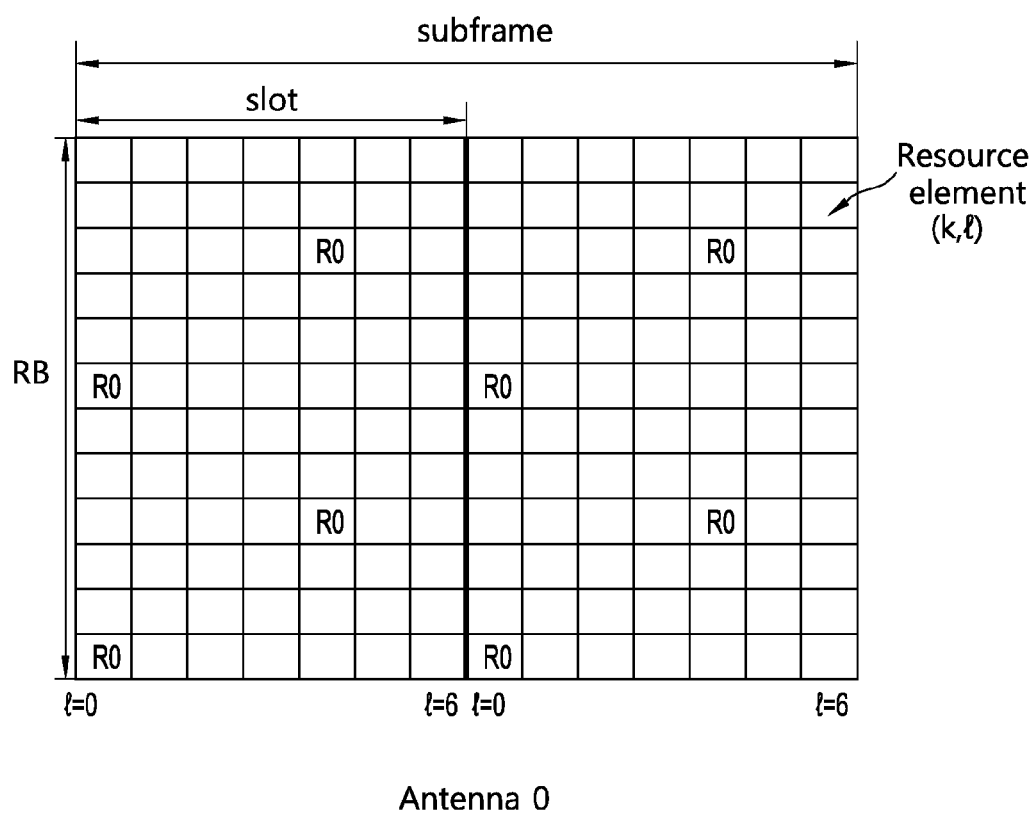
FIGS. 7 to 9 show examples of an RB to which a CRS is mapped.
Figure 8:
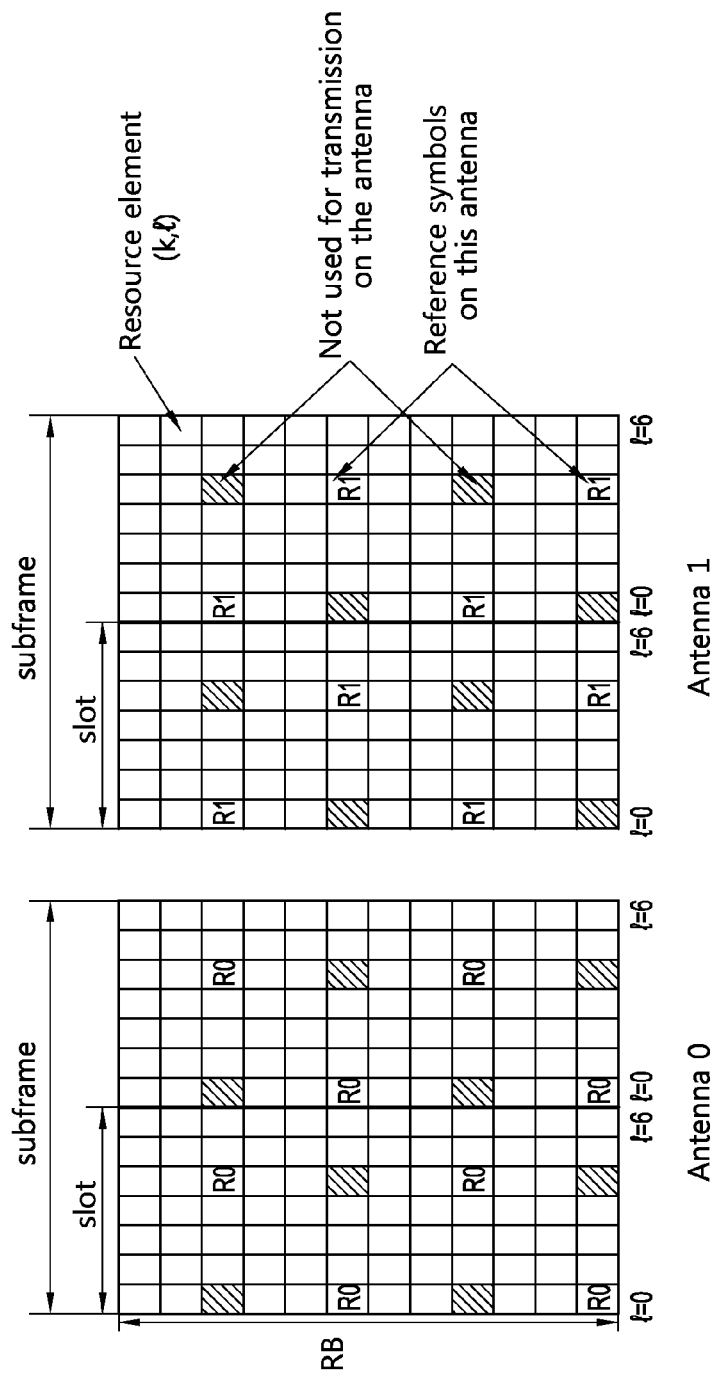
Figure 9:
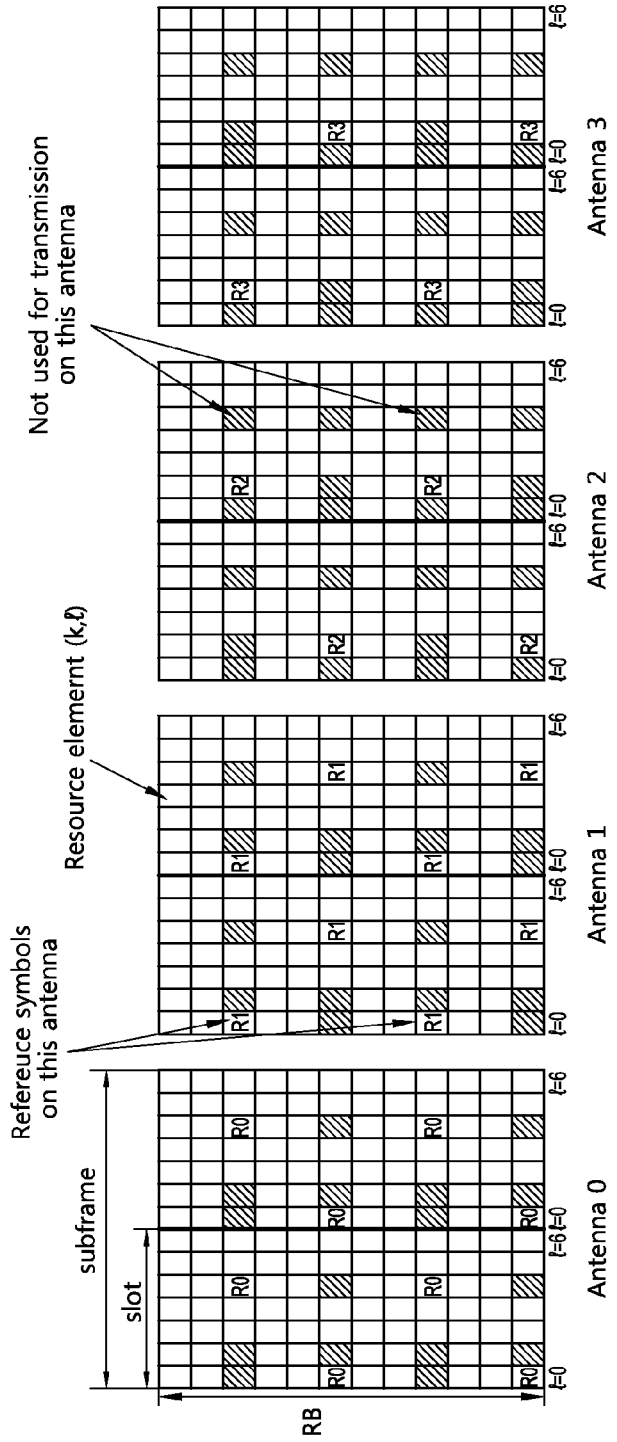

FIGS. 7 to 9 show examples of an RB to which a CRS is mapped.

FIG. 7 shows one example of a pattern in which a CRS is mapped to an RB when a base station uses a single antenna port. FIG. 8 shows one example of a pattern in which a CRS is mapped to an RB when a base station uses two antenna ports. FIG. 9 shows one example of a pattern in which a CRS is mapped to an RB when a base station uses four antenna ports. The CRS patterns may be used to support features of the LTE-A. For example, the CRS patterns may be used to support coordinated multi-point (CoMP) transmission/reception technique, spatial multiplexing, etc. Also, the CRS may be used for channel quality measurement, CP detection, time/frequency synchronization, etc.

Referring to FIGS. 7 to 9, in case the base station carries out multiple antenna transmission using a plurality of antenna ports, one resource grid is allocated to each antenna port. 'R0' represents a reference signal for a first antenna port. 'R1' represents a reference signal for a second antenna port. 'R2' represents a reference signal for a third antenna port. 'R3' represents a reference signal for a fourth antenna port. Positions of R0 to R3 within a subframe do not overlap with each other. l, representing the position of an OFDM symbol within a slot, may take a value ranging from 0 to 6 in a normal CP. In one OFDM symbol, a reference signal for each antenna port is placed apart by an interval of six subcarriers. The number of R0 and the number of R1 in a subframe are the same to each other while the number of R2 and the number of R3 are the same to each other. The number of R2 or R3 within a subframe is smaller than the number of R0 or R1. A resource element used for a reference signal of one antenna port is not used for a reference signal of another antenna port. This is intended to avoid generating interference among antenna ports.

The CRSs are always transmitted as many as the number of antenna ports regardless of the number of streams. The CRS has a separate reference signal for each antenna port. The frequency domain position and time domain position of the CRS within a subframe are determined regardless of user equipments. The CRS sequence multiplied to the CRS is also generated regardless of user equipments. Therefore, all of user equipments within a cell may receive the CRS. However, it should be noted that the CRS position within a subframe and the CRS sequence may be determined according to cell IDs. The time domain position of the CRS within a subframe may be determined according to an antenna port number and the number of OFDM symbols within a resource block. The frequency domain position of the CRS within a subframe may be determined according to an antenna port number, cell ID, OFDM symbol index (l), a slot number within a radio frame, etc.

The CRS sequence may be applied in unit of OFDM symbol within one subframe. The CRS sequence is varied according to a cell ID, a slot number within one radio frame, OFDM symbol index within the slot, type of CP, etc. Two reference signal subcarriers are involved for each antenna port on one OFDM symbol. In case a subframe includes $N_{RB}$ resource blocks in the frequency domain, the number of reference signal subcarriers for each antenna becomes $2 \times N_{RB}$ on one OFDM symbol. Accordingly, a length of a CRS sequence is $2 \times N_{RB}$.

Equation 1 shows an example of a CRS sequence r(m).

$$r(m) = \frac{1}{\sqrt{2}}(1 - 2 \cdot c(2m)) + j\frac{1}{\sqrt{2}}(1 - 2 \cdot (2m + 1)) \quad \langle \text{Equation 1} \rangle$$

where m is $0, 1, \ldots, 2N_{RB}^{max}-1$. $2N_{RB}^{max}-1$ is the number of resource blocks corresponding to the maximum bandwidth. For example, in the 3GPP LTE system, $2N_{RB}^{max}-1$ is 110. c(i), a PN sequence, is a pseudo-random sequence, which may be defined by the Gold sequence of length 31. Equation 2 shows an example of the gold sequence c(n).

$c(n)=(x_1(n+N_C)+x_2(n+N_C))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$    <Equation 2> where $N_C$ is 1600. $x_1(i)$ is a first m-sequence, and $x_2(i)$ is a second m-sequence. For example, the first m-sequence or the second m-sequence may be initialized for each OFDM symbol according to a cell ID, slot number within one radio frame, OFDM symbol index within the slot, type of CP, etc.

In the case of a system having bandwidth smaller than $2N_{RB}^{max}$, only the specific part of length $2 \times N_{RB}$ from a reference signal sequence of length $2N_{RB}^{max}$ may be used.

Frequency hopping may be applied to the CRS. The period of frequency hopping pattern may be one radio frame (10 ms), and each frequency hopping pattern corresponds to one cell identity group.

At least one downlink subframe may be made of an MBSFN subframes by a higher layer within a radio frame on a carrier supporting PDSCH transmission. Each MBSFN subframe may be divided into a non-MBSFN region and an MBSFN region. The non-MBSFN region may occupy first one or two OFDM symbols within the MBSFN subframe. Transmission in the non-MBSFN region may be carried out based on the same CP as the one used in a first subframe (subframe #0) within a radio frame. The MBSFN region may be defined by OFDM symbols not used for the non-MBSFN region. The MBSFN reference signal is transmitted only when a physical multicast channel (PMCH) is transmitted, which is carried out through an antenna port 4. The MBSFN reference signal may be defined only in an extended CP.

A DMRS supports for PDSCH transmission, and is transmitted on the antenna port p=5, p=, 8 or p=7, 8, ..., v+6. At this time, v represents the number of layers used for PDSCH transmission. The DMRS is transmitted to one user equipment through any of the antenna ports belonging to a set S, where S={7, 8, 11, 13} or S={9, 10, 12, 14}. The DMRS is defined for demodulation of PDSCH and valid only when transmission of PDSCH is associated with the corresponding antenna port. The DMRS is transmitted only from a RB to which the corresponding PDSCH is mapped. The DMRS, regardless of the antenna port, is not transmitted in a resource element to which either of a physical channel and a physical signal is transmitted. The DMRS may be referred to Section 6.10.3 of the $3^{rd}$ generation partnership project (3GPP) TS 36.211 V10.1.0 (2011-03) "Technical Specification Group Radio Access Network; Evolved Universal Terrestrial Radio Access (E-UTRA): Physical channels and modulation (Release 8)".

Figure 10:
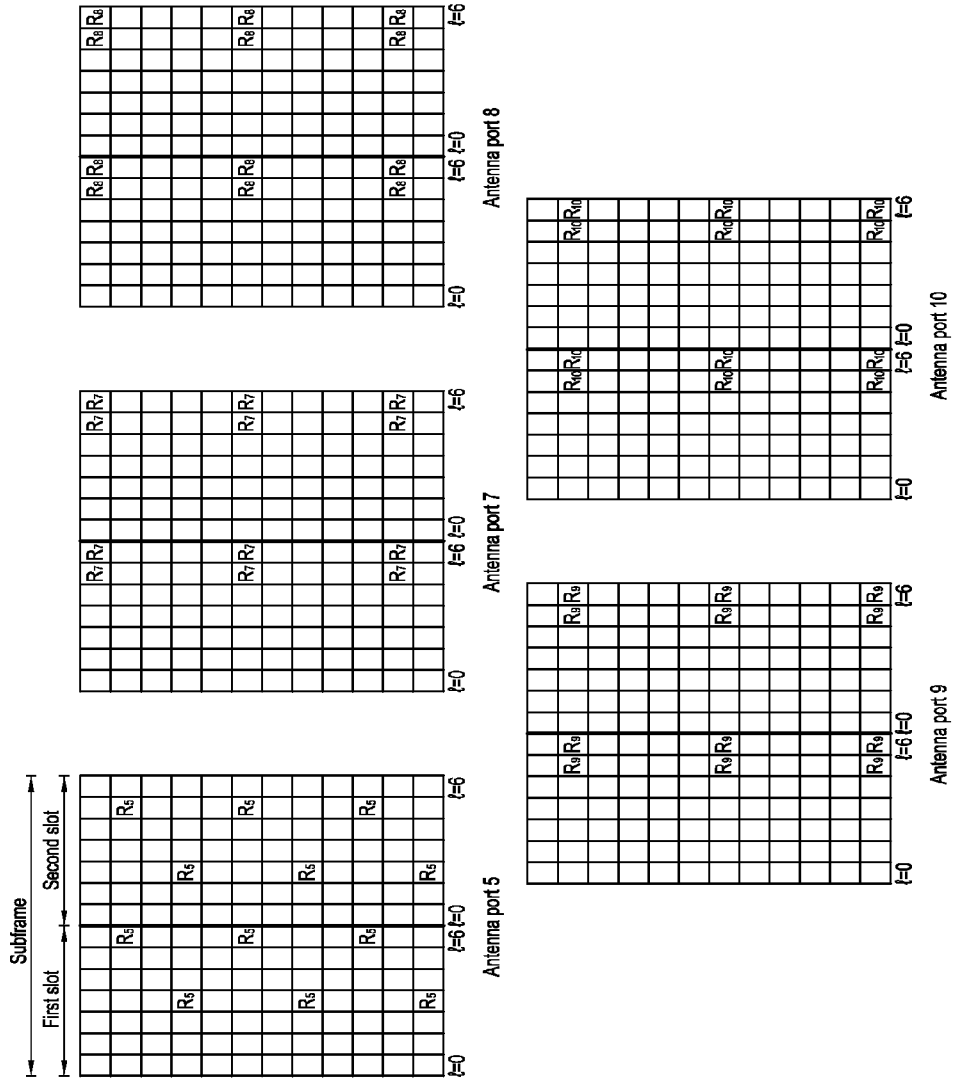
FIG. 10 shows an example of an RB to which a DMRS is mapped.

FIG. 10 shows an example of an RB to which a DMRS is mapped.

FIG. 10 shows resource elements used for the DMRS in a normal CP structure. $R_p$ denotes resource elements used for DMRS transmission on an antenna port p. For example, $R_5$ denotes resource elements used for DMRS transmission on an antenna port 5. Also, referring to FIG. 10, the DMRS for an antenna port 7 and 8 are transmitted through resource elements corresponding to a first, sixth, and eleventh subcarriers (subcarrier index 0, 5, 10) of a sixth and seventh OFDM symbol (OFDM symbol index 5, 6) for each slot. The DMRS for the antenna port 7 and 8 may be identified by an orthogonal sequence of length 2. The DMRS for an antenna port 9 and 10 are transmitted through resource elements corresponding to a second, seventh, and twelfth sub-carriers (subcarrier index 1, 6, 11) of a sixth and seventh OFDM symbol (OFDM symbol index 5, 6) for each slot. The DMRS for the antenna port 9 and 10 may be identified by an orthogonal sequence of length 2. Since S={7, 8, 11, 13} or S={9, 10, 12, 14}, the DMRS for the antenna port 11 and 13 are mapped to resource elements to which the DMRS for the antenna port 7 and 8 are mapped, while the DMRS for the antenna port 12 and 14 are mapped to resource elements to which the DMRS for the antenna port 9 and 10 are mapped.

A CSI RS is transmitted through one, two, four, or eight antenna ports. The antenna ports used for each case is p=15, p=15, 16, p=15, ..., 18, and p=15, ..., 22, respectively. The CSI RS may be defined only Δf=15 kHz. The CSI RS may be referred to Section 6.10.5 of the $3^{rd}$ generation partnership project (3GPP) TS 36.211 V10.1.0 (2011-03) "Technical Specification Group Radio Access Network; Evolved Universal Terrestrial Radio Access (E-UTRA): Physical channels and modulation (Release 8)".

Regarding transmission of the CSI RS, a maximum of 32 configurations different from each other may be taken into account to reduce inter-cell interference (ICI) in a multi-cell environment, including a heterogeneous network (HetNet) environment. The CSI RS configuration is varied according to the number of antenna ports within a cell and CP, and neighboring cells may have the most different configurations. Also, the CSI RS configuration may be divided into two types depending on a frame structure. The two types includes a type applied to both of FDD frame and TDD frame and a type applied only to the TDD frame. A plurality of CSI RS configurations may be used for one cell. For those user equipments assuming non-zero transmission power, 0 or 1 CSI configuration may be used. For those user equipments assuming zero transmission power, 0 or more CSI configurations may be used. The user equipment does not transmit the CSI RS in a special subframe of the TDD frame, in a subframe in which transmission of the CSI RS causes collision with a synchronization signal, a physical broadcast channel (PBCH), and system information block type 1, or in a subframe in which a paging message is transmitted. Also, in the set S, where S={15}, S={15, 16}, S={17, 18}, S={19, 20}, or S={21, 22}, resource elements by which the CSI RS of one antenna port is transmitted are not used for PDSCH or transmission of the CSI RS of a different antenna port.

Figure 11:
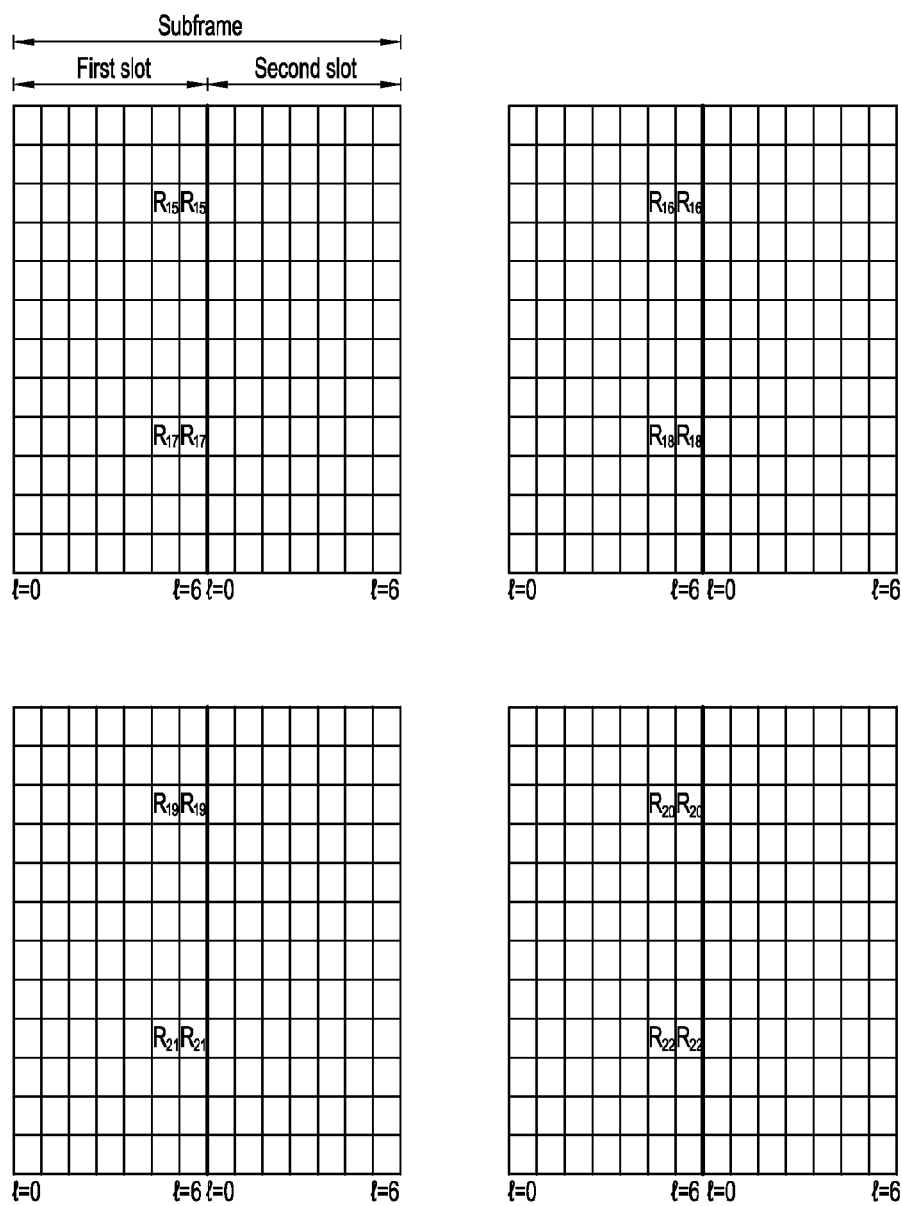
FIG. 11 shows an example of an RB to which a CSI RS is mapped.

FIG. 11 shows an example of an RB to which a CSI RS is mapped.

FIG. 11 shows resource elements used for the CSI RS in a normal CP structure. $R_p$ denotes resource elements used for CSI RS transmission on an antenna port p. Referring to FIG. 11, the CSI RS for an antenna port 15 and 16 are transmitted through resource elements corresponding to a third subcarrier (subcarrier index 2) of a sixth and seventh OFDM symbol (OFDM symbol index 5, 6) of a first slot. The CSI RS for an antenna port 17 and 18 is transmitted through resource elements corresponding to a ninth subcarrier (subcarrier index 8) of a sixth and seventh OFDM symbol (OFDM symbol index 5, 6) of the first slot. The CSI RS for an antenna port 19 and 20 is transmitted through the same resource elements as the CSI RS for an antenna port 15 and 16 is transmitted. The CSI RS for an antenna port 21 and 22 is transmitted through the same resource elements as the CSI RS for an antenna port 17 and 18 is transmitted.

Meanwhile, an RB may be allocated to a PDSCH in a distributed manner or in a continuous manner. The RB indexed sequentially in the frequency domain is called a physical RB (PRB), and the RB obtained by mapping the PRB one more time is called a virtual RB (VRB). Two types of allocation may be supported for allocation of VRBs. A localized type VRB is obtained from one-to-one direct mapping of PRBs indexed sequentially in the frequency domain. A distributed type VRB is obtained by distributed or interleaved mapping of the PRB according to particular rules. To indicate the VRB type, the DCI format 1A, 1B, 1C, and 1D transmitted to allocate the PDSCH through a PDCCH includes a localized/distributed VRB assignment flag. Whether the VRB is a localized type or a distributed type may be determined through the localized/distributed VRB assignment flag.

Hereinafter, a physical control format indicator channel (PCFICH) is described.

Figure 12:
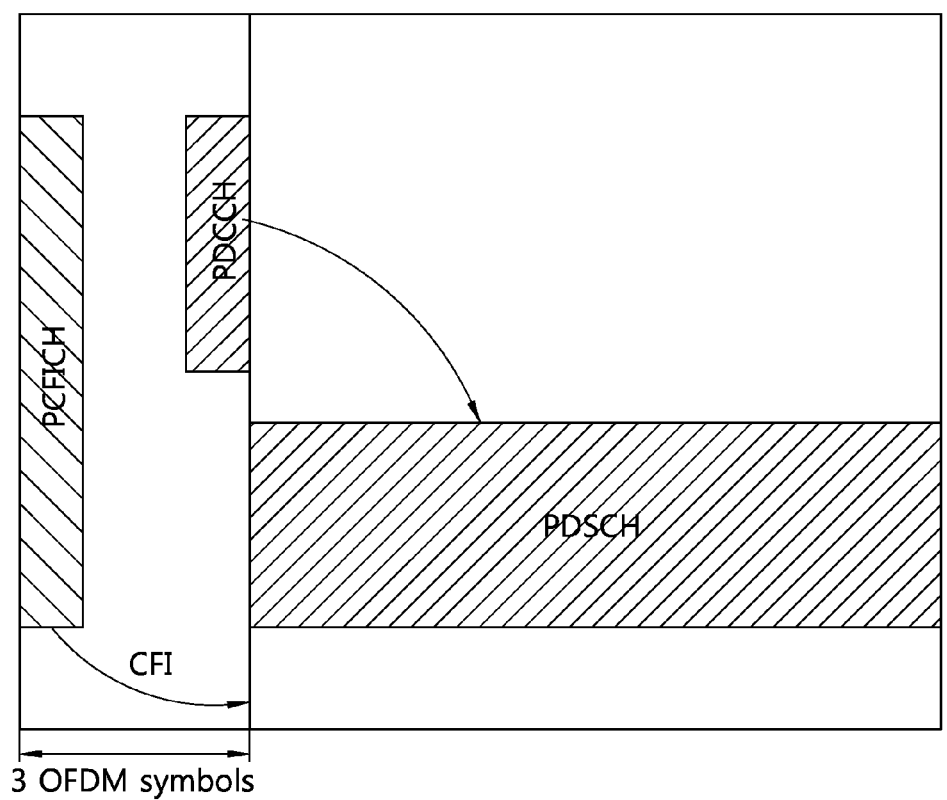
FIG. 12 shows an example where a PCFICH, PDCCH, and PDSCH are mapped to a subframe.

FIG. 12 shows an example where a PCFICH, PDCCH, and PDSCH are mapped to a subframe.

The 3GPP LTE allocates a PDCCH to transmit a downlink control signal intended for controlling user equipments. The region to which PDCCHs of a plurality of user equipments are mapped is called a PDCCH region or a control region. The PCFICH carries information about the number of OFDM symbols used for allocation of the PDCCH within a subframe. The information about the number of OFDM symbols to which the PDCCH is allocated is called a control formation indicator (CFI). All the user equipments within a cell have to search the region to which the PDCCH is allocated, and accordingly, the CIF may be set to a cell-specific value. In general, the control region to which the PDCCH is allocated is allocated to the OFDM symbols at the forefront of a downlink subframe, and the PDCCH may be allocated to a maximum of three OFDM symbols.

Referring to FIG. 12, CIF is set to 3, and accordingly, the PDCCH is allocated to the aforementioned three OFDM symbols within a subframe. The user equipment detects its own PDCCH within the control region and finds its own PDSCH through the detected PDCCH in the corresponding control region.

The PDCCH in the prior art was transmitted by using transmission diversity in a confined region and does not employ various techniques supporting the PDSCH such as beamforming, multi-user multiple-input multiple-output (MU-MIMO), and best band selection. Also, in case a distributed multi-node system is introduced for system performance enhancement, capacity of the PDCCH becomes short if cell IDs of a plurality of nodes or a plurality of RRHs are identical to each other. Therefore, a new control channel may be introduced in addition to the existing PDCCH. In what follows, a control channel newly defined is called an enhanced PDCCH (e-PDCCH). The e-PDCCH may be allocated in a data region rather than the existing control region. As the e-PDCCH is defined, a control signal for each node is transmitted for each user equipment, and the problem of shortage of the PDCCH region can be solved.

As the control region to which the PDCCH is allocated is specified by the PCFICH, a new channel specifying a region to which the e-PDCCH is allocated may be defined. In other words, an enhanced PCFICH (e-PCFICH) may be newly defined, which specifies a region to which the e-PDCCH is allocated. The e-PCFICH may carry part or all of information required for detecting the e-PDCCH. The e-PDCCH may be allocated to a common search space (CSS) within the existing control region or a data region.

Figure 13:
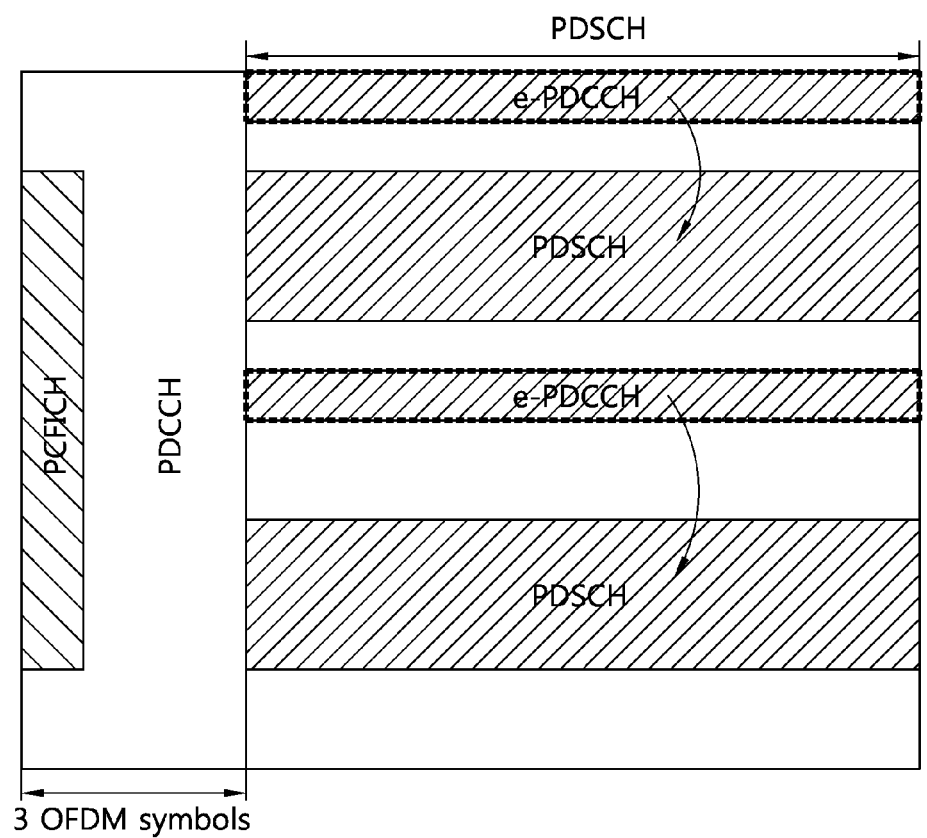
FIG. 13 shows an example of resource allocation through an e-PDCCH.

FIG. 13 shows an example of resource allocation through an e-PDCCH.

The e-PDCCH may be allocated to part of a data region rather than the conventional control region. The e-PDCCH is not provided for the existing legacy user equipments, and those user equipments supporting the 3GPP LTE rel-11 (in what follows, they are called rel-11 user equipments) may search for the e-PDCCH. The rel-11 user equipment performs blind decoding for detection of its own e-PDCCH. The information about the minimum region required for detection of the e-PDCCH may be transmitted through a newly defined e-PCFICH or the existing PDCCH. A PDSCH may be scheduled by the e-PDCCH allocated to the data region. A base station may transmit downlink data to each user equipment through the scheduled PDSCH. However, if the number of user equipments connected to each node is increased, the portion of the data region occupied by the e-PDCCH is enlarged. Therefore, the number of blind decoding that has to be performed by the user equipment is also increased, thus increasing degree of complexity.

Meanwhile, wireless communication systems including relay stations are under development recently. A relay station is intended to extend cell coverage and improve transmission performance. A base station may achieve an effect of extending cell coverage by servicing UEs located at the boundaries of the base station through the relay station. Also, as the relay station improves reliability of signal transmission between the base station and UEs, transmission capacity may be increased. The relay station may be utilized in such a case where a UE is located in a shadow region though the UE may stay within coverage of the base station. The uplink and the downlink between the base station and the relay station are backhaul links while the uplink and the downlink between the base station and a UE, or between the relay station and a UE are access links. Hereinafter, a signal transmitted through the backhaul link is called a backhaul signal, and a signal transmitted through the access link is called an access signal.

Relay zones may be defined in a wireless communication system including relay stations. A relay zone refers to an interval within a downlink subframe transmitted by a base station, where transmission of a control channel (hereinafter, R-PDCCH) for a relay station or transmission of a data channel (hereinafter, R-PDSCH) for the relay station is performed. In other words, the relay zone indicates an interval within a downlink subframe, where backhaul transmission is performed. Transmission between the base station and the relay station is restricted only in the relay zone within a slot. A PDSCH for transmission between the base station and the relay station is processed in the same way as the PDSCH is processed when the relay station is not employed, and the processed PDSCH is mapped to resource elements. However, the corresponding PDSCH is mapped only to the resource elements within the relay region, and if the R-PDCCH is allocated to a first slot of an RB pair, the corresponding PDSCH is not mapped to the first slot of the RB pair.

The R-PDCCH carries DCI for the relay station. The R-PDCCH may be allocated to OFDM symbols of a first slot ranging from the fourth to the last OFDM symbol or OFDM symbols of a second slot ranging from the first to the last OFDM symbol. In frequency domain, a plurality of VRBs to which the R-PDCCH can be allocated may be configured by a higher layer. Without being cross-interleaved with other R-PDCCHs in a given PRB, the R-PDCCH may be transmitted on one or more PRBs. In other cases, a plurality of R-PDCCHs may be cross-interleaved with each other in one or more PRBs.

Figure 14:
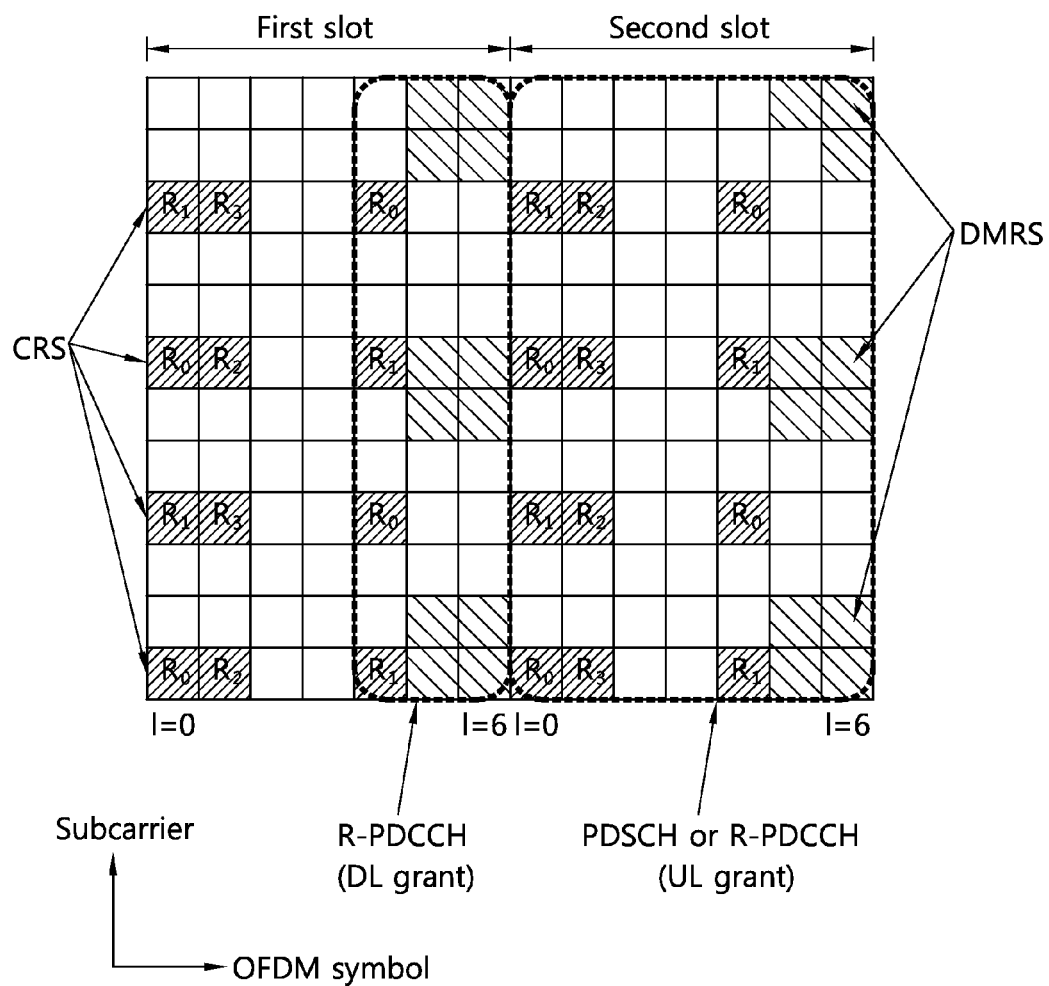
FIG. 14 shows an example of an R-PDCCH allocated to an RB.

FIG. 14 shows an example of an R-PDCCH allocated to an RB.

Referring to FIG. 14, only a DL grant is allocated to a first slot of the RB, and a UL grant or a PDSCH is allocated to a second slot. In this case, the R-PDCCH may be allocated to the remaining REs other than the REs to which a control region, CRS, and DMRS are mapped. Both of the CRS and DMRS may be used for demodulation of the R-PDCCH. If the DMRS is used for demodulation of the R-PDCCH, the antenna port 7 and a scrambling ID (SCID) of 0 may be used. On the other hand, if the CRS is used for demodulation of the R-PDCCH, the antenna port 0 may be used when only one PBCH transmission antenna is employed, whereas if two or four PBCH transmission antennas are used, Tx diversity mode is activated, and antenna ports 0-1 or 0-3 may be utilized.

In allocating an e-PDCCH newly defined for a multi-node system, the structure of the existing R-PDCCH described in FIG. 14 may be re-used. In other words, only the DL grant may be allocated to the first slot in the RB, and the UL grant or the PDSCH may be allocated in the second slot. Also, the e-PDCCH may be allocated to the remaining REs other than the REs to which the control region, CRS, and DMRS are mapped. By adopting the existing structure, the e-PDCCH may be allocated without exerting a large influence on the existing standards.

Hereinafter, a method for allocating a downlink control channel according to the present invention is described.

Since an e-PDCCH is allocated to a data region of an RB, the e-PDCCH may be allocated in the same way as the PDSCH is allocated in the frequency domain. In other words, the e-PDCCH may be allocated to a data region in one of a localized-type VRB and distributed-type VRB. Also, according to a method for allocating the R-PDCCH, cross-interleaving may be applied to allocation of the e-PDCCH. Therefore, the e-PDCCH may be allocated to the data region according to a method described below.

Figure 15:
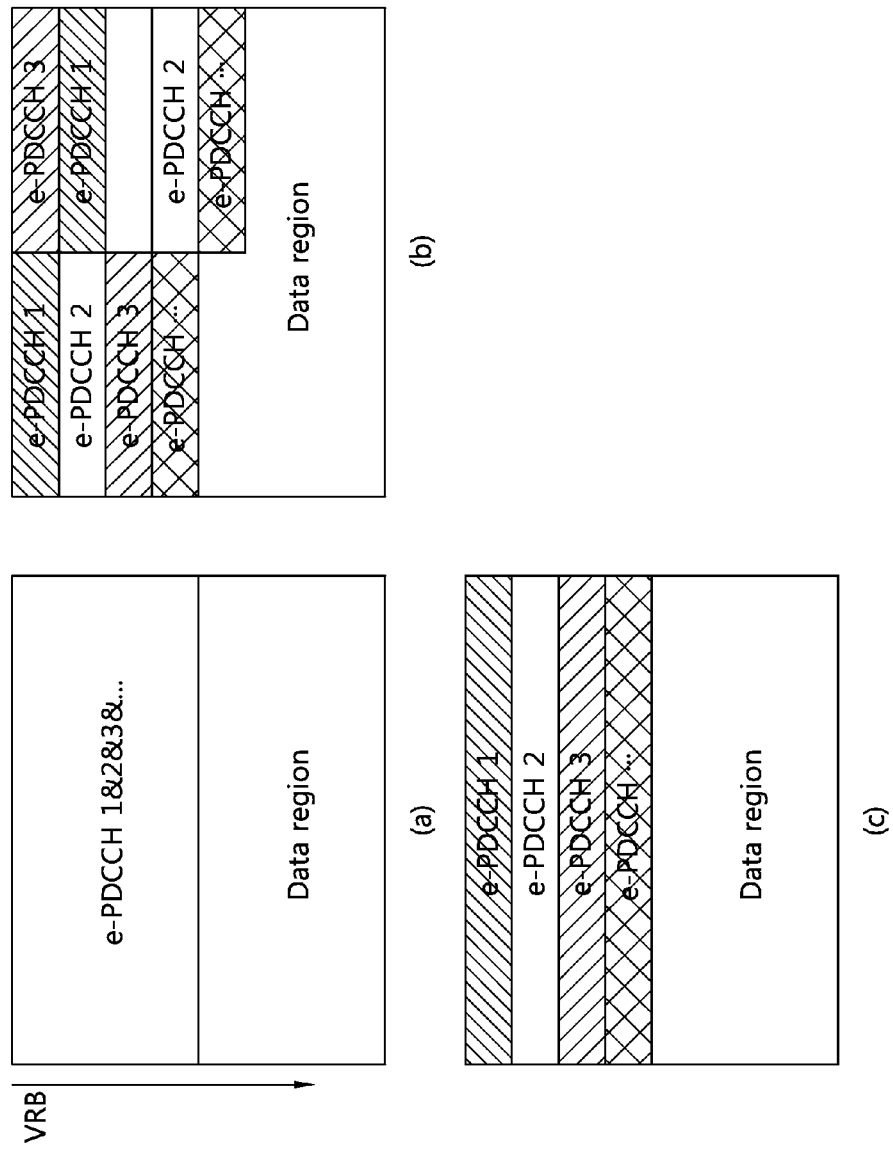
FIG. 15 shows an example where an e-PDCCH is allocated to a data region.

FIG. 15 shows an example where an e-PDCCH is allocated to a data region.

1) The e-PDCCH is allocated to a localized-type VRB or a distributed-type VRB, and a plurality of e-PDCCHs is allocated being mixed together in the data region through cross-interleaving. Referring to FIG. 15-(a), a plurality of e-PDCCHs is allocated being mixed together in the data region through cross-interleaving.

2) Without cross-interleaving among a plurality of e-PDCCHs, each e-PDCCH is mapped to a distributed-type VRB. In other words, a first slot and a second slot comprising one e-PDCCH are allocated to RBs occupying different frequency regions from each other. The e-PDCCH and/or the PDSCH allocated to the first and the second slot of one PRB may be transmitted to different UEs. Referring to FIG. 15-(b), each e-PDCCH is allocated to the first and the second slot of different frequency regions.

3) Without cross-interleaving among a plurality of e-PDCCHs, each e-PDCCH is mapped to a localized-type VRB. A first slot and a second slot comprising one e-PDCCH are allocated to an RB in a contiguous subband region. The e-PDCCH and/or the PDSCH allocated to the first and the second slot of one PRB is transmitted to the same UE. Referring to FIG. 15-(c), each e-PDCCH is allocated to the first and the second slot of the same frequency region.

Although the e-PDCCH of FIG. 15 is assumed to be allocated across the entire subframe, the e-PDCCH may be allocated to the subframe in various other ways. That is, the e-PDCCH may be allocated across the entire subframe, or the e-PDCCH may be allocated only to a part of OFDM symbols of the subframe. For example, the e-PDCCH may be allocated only to a first slot of the subframe. Also, it should be noted that although e-PDCCHs of FIG. 15 are allocated being adjacent to each other, their allocation represents logical adjacency, but the e-PDCCHs may be allocated being physically distributed from or adjacent to each other.

When the e-PDCCH is allocated to a VRB without cross-interleaving, the e-PDCCH may be allocated across the entire subframe or only to the first slot.

Figure 16:
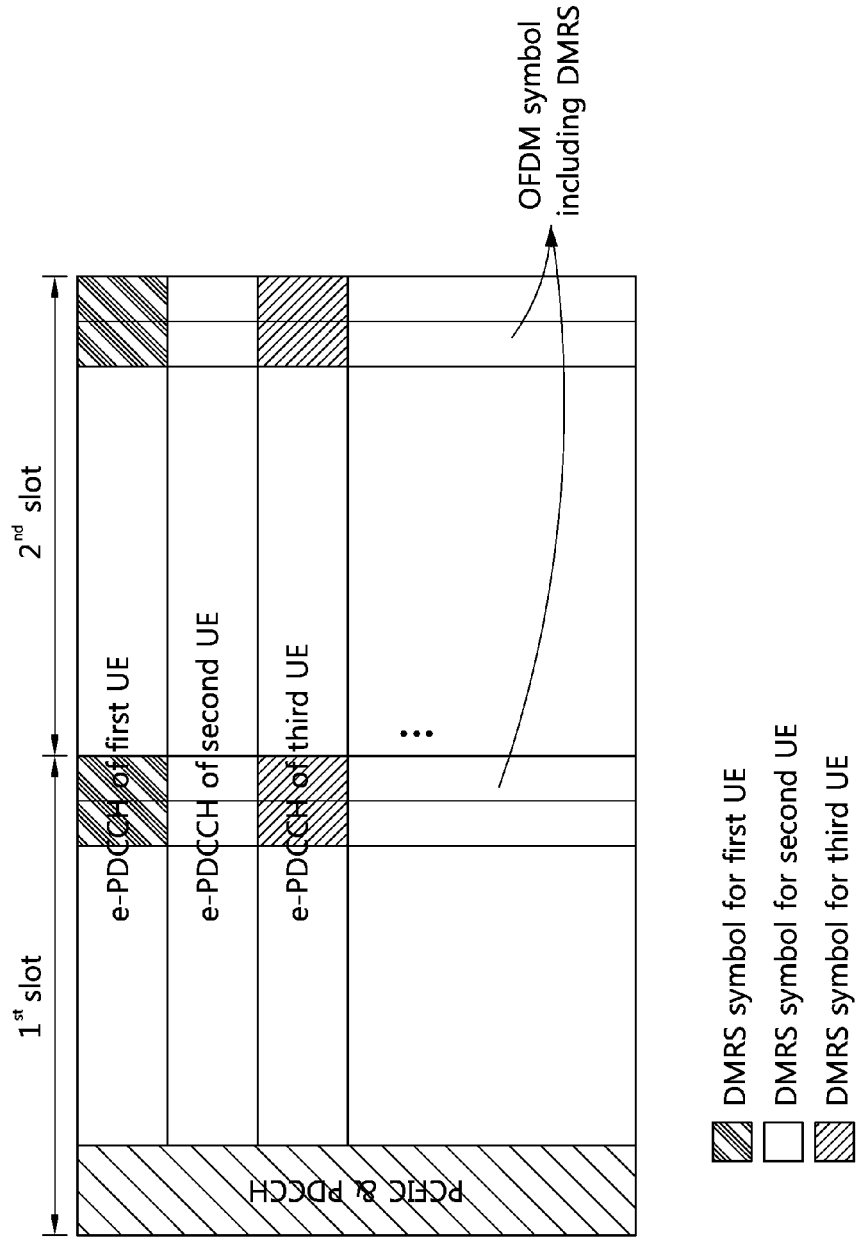
FIG. 16 shows another example where an e-PDCCH is allocated to a data region.

FIG. 16 shows another example where an e-PDCCH is allocated to a data region.

FIG. 16 shows the case where the e-PDCCH is allocated to two slots of one PRB except for the existing control region to which the PDCCH is allocated. The e-PDCCH of a first UE, the e-PDCCH of a second UE, and the e-PDCCH of a third UE are multiplexed according to the frequency division multiplexing (FDM) method. A DMRS may be transmitted through an antenna port of each UE in the region to which the e-PDCCH of each UE is allocated.

Excluding resource elements to which the existing control region and reference signals are allocated, 32-52 resource elements of a first slot and 60 resource elements of a second slot in one RB may be used for allocating the e-PDCCH. Since one CCE, which is a basic allocation unit for a control channel, comprises 36 resource elements, 1 CCE may be transmitted in the first slot approximately, and the amount exceeding slightly 1 CCE may be transmitted in the second slot. Therefore, when the e-PDCCH is allocated as described in FIG. 16, two CCEs may be allocated to the e-PDCCH in one RB. When the e-PDCCH is allocated to a localized-type VRB, four CCEs may be allocated to the e-PDCCH in two RBs. If the e-PDCCH is allocated in the above manner, frequency diversity may not be fully gained. At the same time, if the e-PDCCH is allocated to a distributed-type VRB to obtain frequency diversity, channel estimation performance for the e-PDCCH and PDSCH may be degraded since channel estimation of the e-PDCCH has to be performed for each slot.

Figure 17:
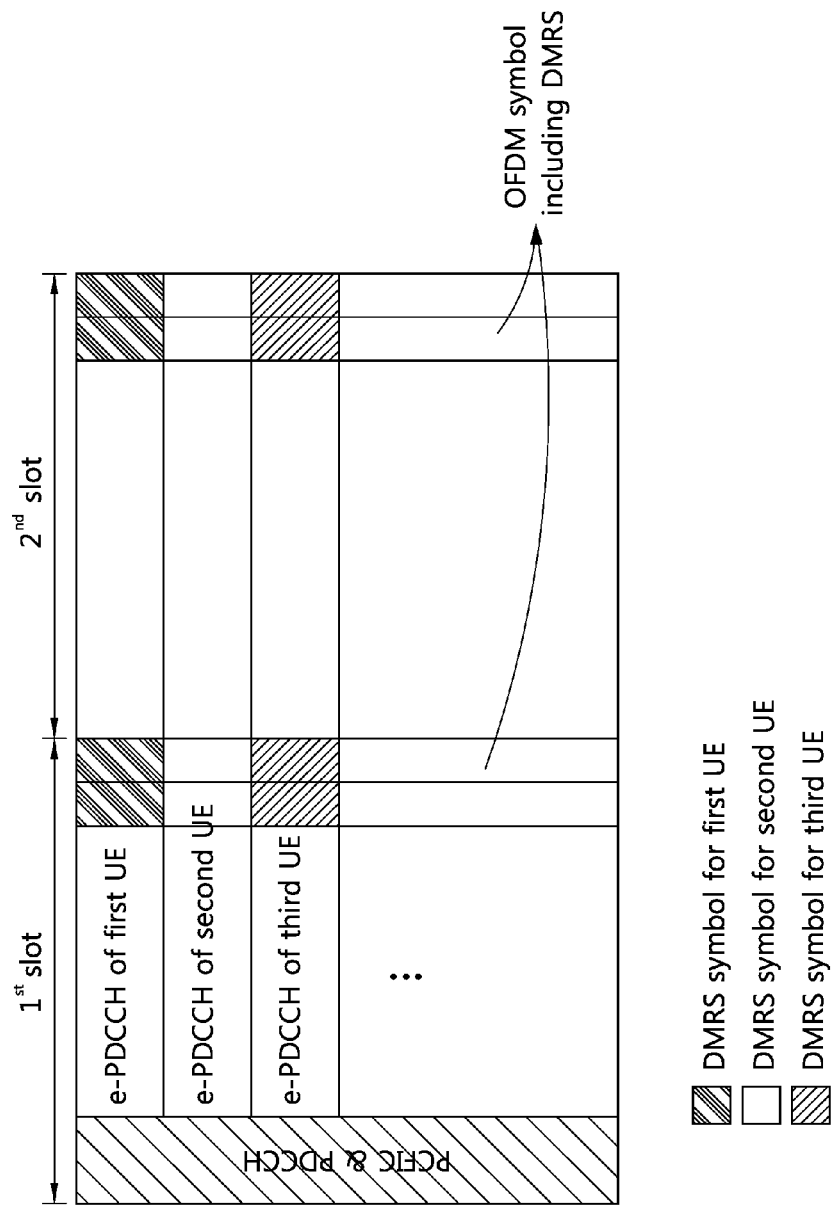
FIG. 17 shows another example where the e-PDCCH is allocated to a data region.

FIG. 17 shows another example where the e-PDCCH is allocated to a data region.

FIG. 17 shows the case where the e-PDCCH is allocated only to the first slot except for the existing control region to which the PDCCH is allocated. This embodiment is therefore similar to the case where the R-PDCCH is allocated. The PDSCH may be allocated to the second slot, or none may be allocated thereto. A DMRS may be transmitted through an antenna port of each UE in the region to which the e-PDCCH of each UE is allocated. If the e-PDCCH is allocated in the above manner, the processing delay due to operation after decoding the e-PDCCH is expected to smaller than that incurred when the e-PDCCH is allocated as described in FIG. 16. However, since the e-PDCCH is allocated only to the first slot, channel estimation performance at the time of decoding the e-PDCCH may be degraded. If the DMRS is employed for decoding the e-PDCCH, since the DMRS is transmitted from the last two OFDM symbols of each slot, therefore, channel estimation performance may be degraded only with the DMRS included in the first slot.

Figure 18:
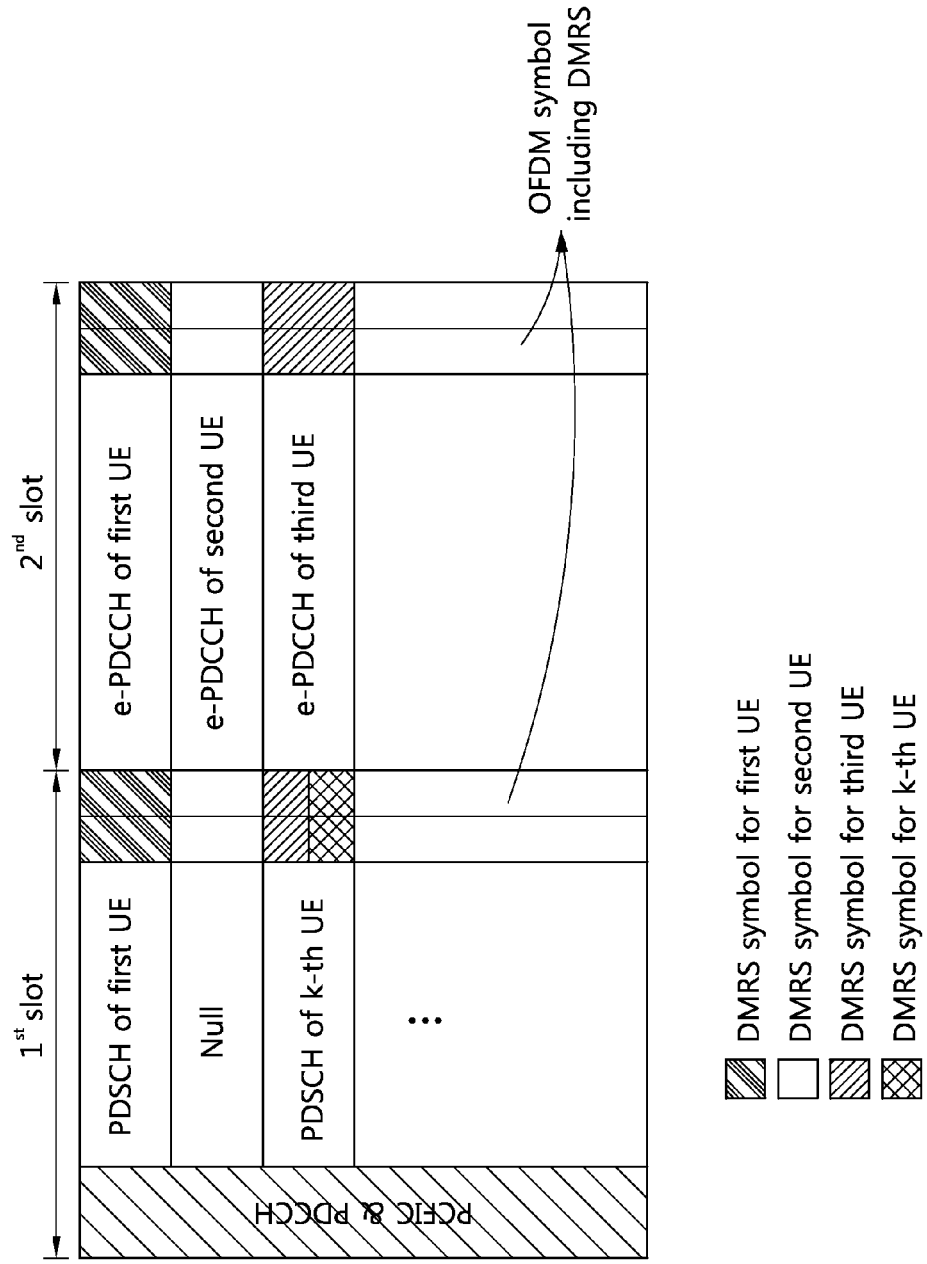
FIG. 18 shows one example where an e-PDCCH is allocated to a data region according to a proposed method for allocating a downlink control channel.

FIG. 18 shows one example where an e-PDCCH is allocated to a data region according to a proposed method for allocating a downlink control channel.

To remedy the shortcomings and solve the problem above, the present invention proposes allocating the e-PDCCH to the second slot. In other words, the base station allocates the e-PDCCH to the second slot. The PDSCH may be allocated to the first slot, or none may be allocated thereto. Referring to FIG. 18, the e-PDCCH of a first UE is allocated to the second slot of a first RB, and the PDSCH of the first UE is allocated to the first slot of the first RB. Also, the e-PDCCH of a second UE is allocated to the second slot of a second RB, but none is allocated to the first slot of the second RB. The e-PDCCH of a third UE is allocated to the second slot of a third RB, and the PDSCH of a k-th UE is allocated to the first slot of the third RB.

If the e-PDCCH is allocated to the second slot, channel estimation may be performed by using all of the DMRSs transmitted in the first and the second slot when the e-PDCCH is decoded. For example, if the PDSCH of one UE is allocated to the first slot or the first slot is empty as shown in the first or the second RB of FIG. 18, a DMRS for decoding the e-PDCCH may be allocated to the first slot. On the other hand, even if the PDSCH of a different UE is allocated to the first slot, a DMRS for decoding the e-PDCCH may be allocated to the first slot in addition to the DMRS for PDSCH of the corresponding UE. If the PDSCH of the k-th UE is allocated to the first slot of the third RB in FIG. 18, both of the DMRS for decoding the e-PDCCH of the third UE and the DMRS for the PDSCH of the k-th UE may be allocated to the first slot of the third RB.

As described in FIG. 18, if the e-PDCCH is allocated to the second slot in an RB, the start point of the e-PDCCH may be fixed (e.g., the first OFDM symbol of the second slot), the number of resource elements used for transmitting data may be fixed accordingly. Moreover, the e-PDCCH may be decoded even if a control format indicator (CFI) is not received through a PCFICH. However, a processing delay may still persist, which can be solved if the e-PDCCH is defined to point to the PDSCH of the next subframe.

Figure 19:
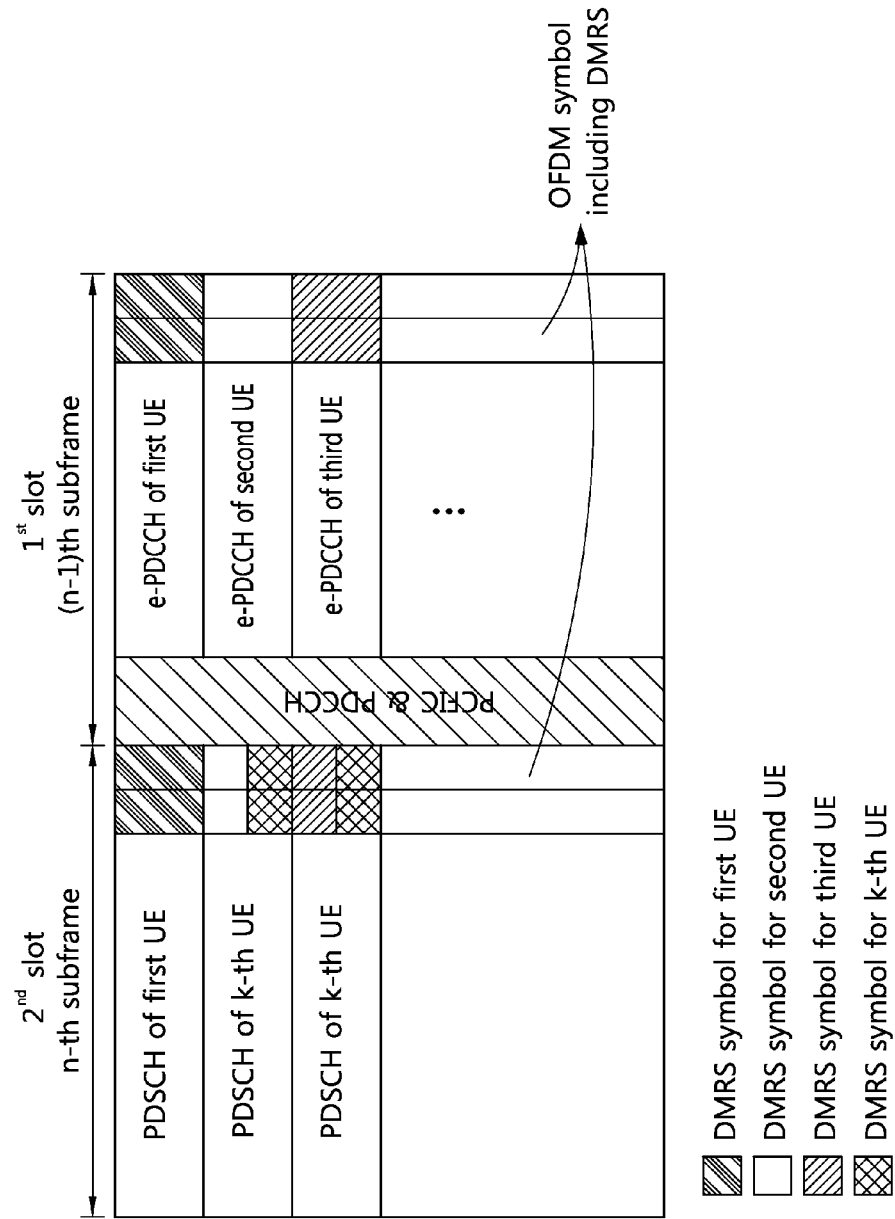
FIG. 19 shows another example where an e-PDCCH is allocated to a data region according to a proposed method for allocating a downlink control channel.

FIG. 19 shows another example where an e-PDCCH is allocated to a data region according to a proposed method for allocating a downlink control channel.

Referring to FIG. 19, the e-PDCCH is allocated to a first slot in an RB. And a DMRS for decoding the e-PDCCH is allocated to a second slot of a previous subframe. In other words, if the e-PDCCH of a first UE is allocated to the first slot of the n-th subframe in the first RB, a DMRS for decoding the e-PDCCH of the first UE is allocated to the second slot of the (n−1)-th subframe. If the e-PDCCH of a second UE is allocated to the first slot of the n-th subframe in the second RB, a DMRS for decoding the e-PDCCH of the second UE is allocated to the second slot of the (n−1)-th subframe. The DMRS for decoding the e-PDCCH of the second UE may be allocated together with the DMRS for decoding the PDSCH of the k-th UE. In the same manner, if the e-PDCCH of a third UE is allocated to the first slot of the n-th subframe, a DMRS for decoding the e-PDCCH of the third UE is allocated to the second slot of the (n−1)-th subframe. The DMRS for decoding the e-PDCCH of the third UE may be allocated together with the DMRS for decoding the PDSCH of the k-th UE.

As described in FIG. 19, as the e-PDCCH is allocated to the first slot, channel estimation may be performed by using the DMRS allocated to the second slot of the previous subframe and the DMRS allocated to the first slot of the current subframe.

Meanwhile, if the e-PDCCH is allocated to the first slot in an RB, the DMRS for decoding the e-PDCCH may be allocated to the second slot of the current subframe rather than the second slot of the previous subframe. The UE may perform channel estimation by using the DMRS allocated to the first and the second slot of the current subframe. However, if channel estimation of the e-PDCCH allocated to the first slot is performed by using the DMRS allocated to the second slot, channel estimation performance may be degraded.

Figure 20:
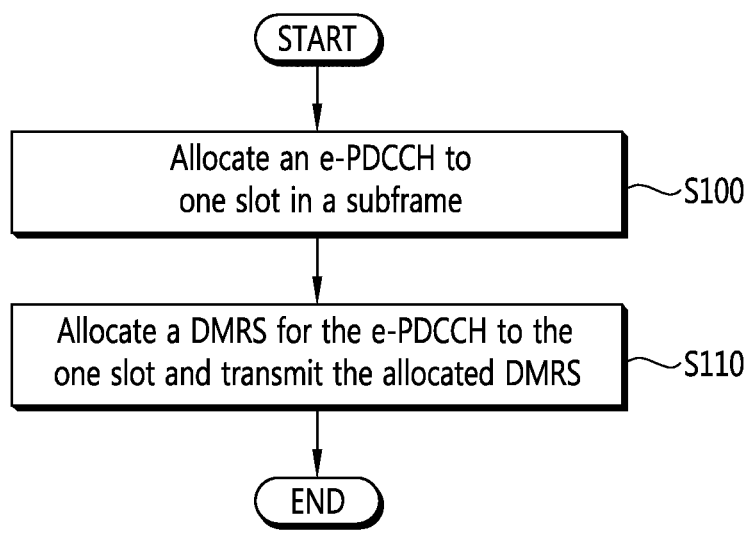
FIG. 20 shows an embodiment of a proposed method for allocating a downlink control channel.

FIG. 20 shows an embodiment of a proposed method for allocating a downlink control channel.

Referring to FIG. 20, in step S100, the base station allocates the e-PDCCH to one slot of a subframe. In step S110, the base station allocates a DMRS for the e-PDCCH to the one slot and transmits the DMRS. As described in FIG. 18, if the one slot is the second slot of a subframe, the base station allocates a DMRS for the e-PDCCH in the first slot of the subframe and transmits the DMRS. As described in FIG. 19, if the one slot is the first slot of a subframe, the base station allocates a DMRS for the e-PDCCH to the second slot of the previous subframe of the subframe and transmits the DMRS.

Figure 21:
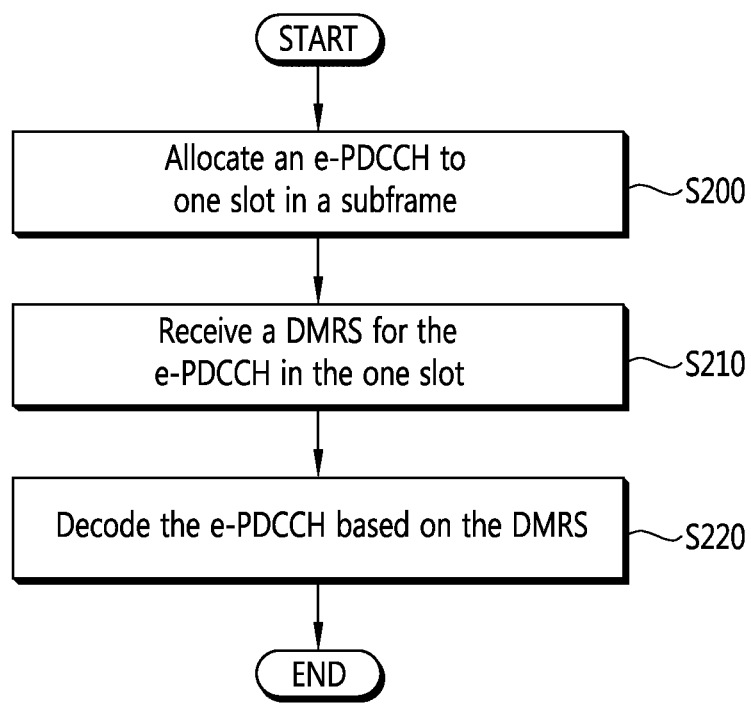
FIG. 21 shows an embodiment of a proposed method for detecting a downlink control channel.

FIG. 21 shows an embodiment of a proposed method for detecting a downlink control channel.

Referring to FIG. 21, in step S200, the UE allocates the e-PDCCH to one slot of a subframe. In step S210, the UE receives a DMRS for the e-PDCCH in the one slot. As described in FIG. 18, if the one slot is the second slot of a subframe, the UE receives a DMRS for the e-PDCCH additionally in the first slot of the subframe. As described in FIG. 19, if the one slot is the first slot of a subframe, the UE receives a DMRS for the e-PDCCH additionally in the second slot of the previous subframe of the subframe. In step S220, the UE decodes the e-PDCCH based on the DMRS.

Hereinafter, when an e-PDCCH is allocated, a method for allocating an antenna port of a reference signal used for decoding the e-PDCCH is described. The method for allocating an antenna port described below corresponds to the method for allocating an e-PDCCH described in FIG. 15. The rank of an e-PDCCH and that of a PDSCH allocated to the same UE may differ from each other. For example, rank of the e-PDCCH may be smaller than that of the PDSCH. The antenna port used for decoding the e-PDCCH may correspond to one of antenna ports used for decoding the PDSCH.

Figure 22:
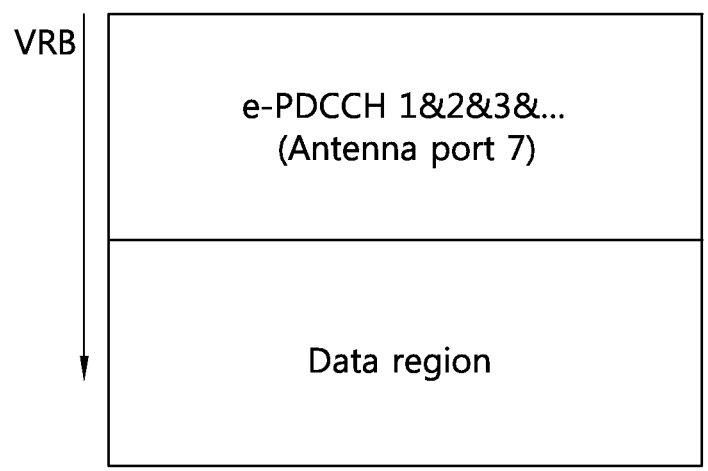
FIG. 22 shows an example where an antenna port for an e-PDCCH is allocated according to a proposed method for allocating an antenna port.

FIG. 22 shows an example where an antenna port for an e-PDCCH is allocated according to a proposed method for allocating an antenna port.

FIG. 22 corresponds to FIG. 15-(a). If a plurality of e-PDCCHs is allocated being mixed with each other to a data region through cross-interleaving, it is not feasible to allocate antenna ports only for one e-PDCCH. Therefore, one antenna port is allocated for the entire e-PDCCH region. Referring to FIG. 22, the antenna port 7 is allocated to a plurality of e-PDCCHs. If rank of the e-PDCCH is 1, one antenna port may be allocated. If rank of the e-PDCCH is 2, two antenna ports may be allocated. All of the e-PDCCHs may be decoded through the allocated antenna ports. At this time, the antenna port allocated for the e-PDCCH may be fixed or determined by long-term signaling. Or the base station informs the UE of an antenna port set beforehand and uses part of the antenna ports for the e-PDCCHs. The UE may find out the antenna port used through blind decoding.

FIG. 23 shows another example where an antenna port meant for an e-PDCCH is allocated according to a proposed method for allocating an antenna port.

FIG. 23 corresponds to FIG. 15-(b). If each e-PDCCH is mapped to a distributed-type VRB without cross-interleaving among a plurality of e-PDCCHs, the base station may allocate an antenna port, to which the e-PDCCH may be transmitted, to the UE or may allocate the same antenna port to all of the e-PDCCHs as described in FIG. 22.

Referring to FIG. 23-(a), the base station allocates an antenna port, to which the e-PDCCH can be transmitted, to the UE. In other words, the antenna port 7 is allocated to a first e-PDCCH, the antenna port 8 is allocated to a second e-PDCCH, the antenna port 9 is allocated to a third e-PDCCH, and so on. Since an e-PDCCH and/or a PDSCH for a different UE may be allocated to each slot in one RB, channel estimation is performed in a unit of slot rather than in a unit of RB. Accordingly, channel estimation performance may be degraded. The base station may inform the UE on the information of an antenna port allocated to each e-PDCCH before allocating the e-PDCCH.

Referring to FIG. 23-(b), the base station allocates the same antenna port to all of the e-PDCCHs. The antenna port 7 is allocated to all of the e-PDCCHs. The antenna port allocated to the e-PDCCH may be fixed or determined by long-term signaling. The base station informs the UE of an antenna port set beforehand and uses part of the antenna ports for the e-PDCCH, and the UE may find out the antenna port used through blind decoding.

As shown in FIG. 23-(a), an e-PDCCH and/or a PDSCH for a different UE may be allocated to each slot in one RB, channel estimation has to be performed in a unit of slot rather than a unit of RB. In this case, for enabling channel estimation in a unit of RB, scheduling becomes complicated since the e-PDCCH and/or PDSCH of the UEs using the same antenna port and the same beam has to be allocated to one RB.

Figure 24:
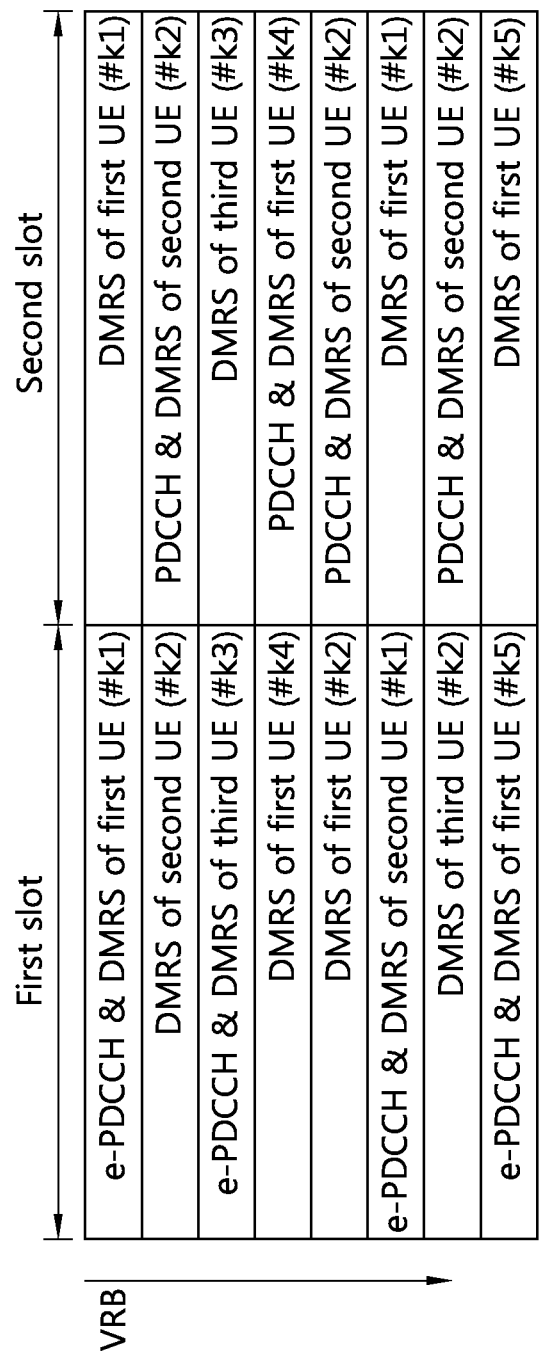
FIG. 24 shows another example where an antenna port meant for an e-PDCCH is allocated according to a proposed method for allocating an antenna port.

FIG. 24 shows another example where an antenna port meant for an e-PDCCH is allocated according to a proposed method for allocating an antenna port.

Referring to FIG. 24, when a first UE to which a first PRB is allocated receives an e-PDCCH and/or PDSCH in a first slot, the first UE receives the e-PDCCH and/or PDSCH and a DMRS through an antenna port k1 in the first slot and receives a DMRS of the antenna port k1 in a second slot. Meanwhile, when a second UE to which the first PRB is allocated receives the e-PDCCH and/or PDSCH in the second slot, the second UE receives the e-PDCCH and/or PDSCH and a DMRS through an antenna port k2 in the second slot and receives a DMRS of the antenna port k2 in the first slot. Likewise, when a third UE to which a second PRB is allocated receives the e-PDCCH and/or PDSCH in the first slot, the third UE receives the e-PDCCH and/or PDSCH and a DMRS through the antenna port k3 in the first slot and receives a DMRS of the antenna port k3 in the second slot. When the first UE to which the second PRB is allocated receives the e-PDCCH and/or PDSCH in the second slot, the first UE receives the e-PDCCH and/or PDSCH and a DMRS through the antenna port k4 in the second slot and receives a DMRS of the antenna port k4 in the first slot. By allocating antenna ports in the above manner, any UE may perform channel estimation in RB units.

At this time, the UE may receive information about an antenna port for receiving the e-PDCCH and/or PDSCH allocated to the UE itself through one of a higher layer, e-PCFICH, and e-PDCCH. Also, the UE may receive information about a different antenna port which may be allocated to the same RB or information about resource elements to which a DMRS may be transmitted through a higher layer. Also, if a DMRS transmitted through the same resource elements is allocated to two UEs using the same RB, no further information about a different DMRS requires signaling, and the resource elements to which a different DMRS is allocated may be used for data transmission.

If each e-PDCCH is mapped to a localized-type VRB without cross-interleaving among a plurality of e-PDCCHs, antenna ports may be allocated to a UE since the each e-PDCCH is allocated to each RB. At this time, the base station may allocate one antenna port for e-PDCCH transmission to the UE. One antenna port may be allocated to two or more UEs different from each other. However, taking account of the fact that supporting MU-MIMO and the number of antenna ports in localized-type resource allocation is limited, whether UEs are selected to support MU-MIMO is varied depending on scheduling or channel conditions. The same antenna port may be allocated to the UEs appropriate for supporting MU-MIMO, or MU-MIMO may not be introduced as the same antenna port is employed. This is so because an antenna port used for decoding the e-PDCCH is also used for decoding the PDSCH.

Therefore, one or more antenna ports used for transmission of the e-PDCCH may be allocated to the UE. One or more antenna ports are pre-determined, or the base station informs the UE about the antenna ports through the higher layer. For example, one or more antenna ports used for transmission of the e-PDCCH are assigned as {k1, m1} and the e-PDCCH is transmitted through the antenna port k1. The UE performs blind decoding for both of the antenna ports k1 and m1 to which the e-PDCCH may be transmitted and may know that the e-PDCCH of the UE itself has been transmitted through the antenna port k1. Accordingly, even though the e-PDCCH is transmitted to the same UE, the e-PDCCH may be transmitted through the remaining antenna port in the next subframe without separate signaling.

After decoding the e-PDCCH, the UE may figure out the antenna port to which the PDSCH is transmitted. The UE may identify the antenna port to which the e-PDCCH is transmitted, and the UE may identify the antenna port to which the PDSCH is transmitted by using the information transmitted through the e-PDCCH. The antenna port to which the e-PDCCH is transmitted corresponds to the antenna port to which one of layers of the PDSCH is transmitted, and by using the information transmitted through the e-PDCCH, the UE may identify the antenna port to which the remaining layers are transmitted. Or, based on the information about the antenna ports to which the e-PDCCH may be transmitted and the antenna port to which the e-PDCCH has been transmitted, the UE may identify the antenna port to which the PDSCH is transmitted. For example, if the antenna ports to which the e-PDCCH may be transmitted are {k1, m1}, the antenna ports to which the PDSCH may be transmitted may be comprised of a few sets including the antenna port to which the e-PDCCH may be transmitted, such as {k1, k2, . . . , kN} and {m1, m2, . . . , mL}. For example, if the e-PDCCH is transmitted through the antenna port k1, layers of the PDSCH may be transmitted through as many antenna ports as the number of layers starting from the first antenna port of the antenna ports {k1, k2, . . . , kN}. The UE may receive information about a set of antenna ports to which the PDSCH may be transmitted through the higher layer or e-PDCCH. At this time, the antenna port to which the e-PDCCH may be transmitted may be omitted.

Figure 25:
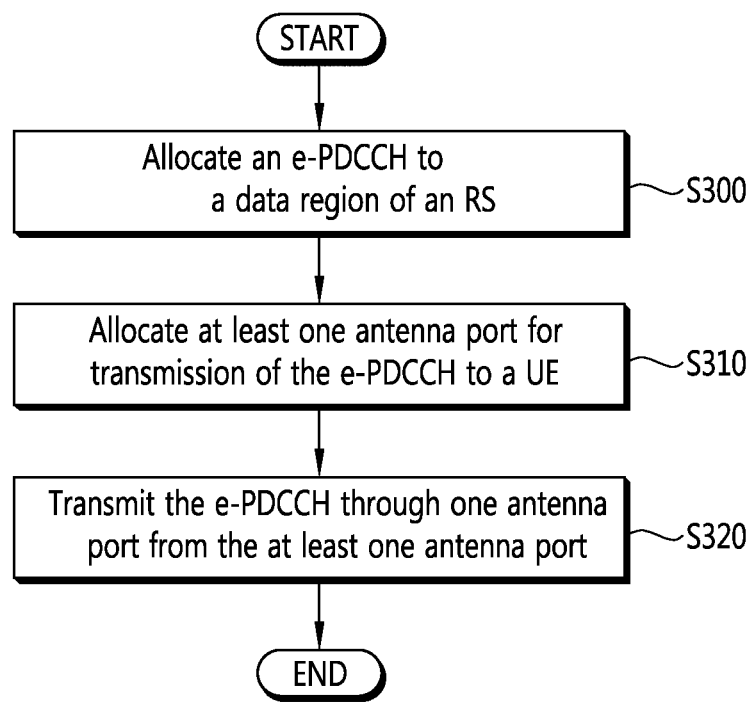
FIG. 25 shows an embodiment of a proposed method for allocating an antenna port.

FIG. 25 shows an embodiment of a proposed method for allocating an antenna port.

In step S300, the base station allocates the e-PDCCH to the data region of an RB. The e-PDCCH may be allocated to a localized-type VRB or a distributed-type VRB. In step S310, the base station allocates at least one antenna port to the UE for transmission of the e-PDCCH. When an antenna port for transmission of the e-PDCCH is allocated to the UE, various method described above may be applied. In step S320, the base station transmits the allocated e-PDCCH to the UE through the whole or part of at least one antenna port.

Figure 26:
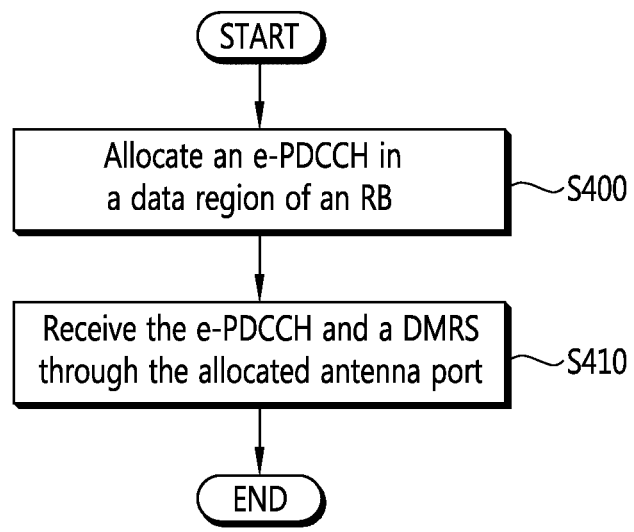
FIG. 26 shows an embodiment of a proposed method for receiving an e-PDCCH.

FIG. 26 shows an embodiment of a proposed method for receiving an e-PDCCH.

In step S400, the UE allocates the e-PDCCH to the data region of an RB. The e-PDCCH may be allocated to a localized-type VRB or a distributed-type VRB. In step S410, the UE receives the e-PDCCH or DMRS through the antenna port allocated by the base station. The antenna port may be allocated by various methods described above.

Meanwhile, currently antenna ports allocated to the DMRS (hereinafter, DMRS ports) are used sequentially, starting from the antenna port 7 according to the number of layers used for PDSCH transmission. For example, when the number of layers is 2, the DMRS ports correspond to the antenna ports 7 and 8. When the number of layers is 4, the DMRS ports correspond antenna ports 7 to 10. If DMRS ports in a multi-node system including a plurality of nodes are allocated according to the conventional manner, the DMRS ports of UEs connected to the respective nodes will have a high probability of colliding with each other. For example, suppose a plurality of nodes A, B, and C having the same cell ID are located close to each other and each node performs rank-2 transmission to UE a, b, and c, respectively. If DMRS ports are allocated according to the conventional manner, there is no other choice but to allocate DMRS ports 7 and 8 of which SCID=0 to the UE a, DMRS ports 7 and 8 of which SCID=1 to the UE b, and DMRS ports 7 and 8 of which SCID=1 to the UE c in order for the DMRS ports of the UEs connected to the respective nodes to avoid collision as possibly as can be. In this case, since the DMRS ports of the UE a and c collide with each other, a problem occurs in data decoding. To solve the problem, the SCID used together with a DMRS port may have more values in addition to the current values 0 and 1. However, if one DMRS port uses more SCIDs than necessary, performance of channel estimation may become lower than the case of using orthogonal DMRS ports. In other words, the case of using a DMRS port 7 of which SCID=0 and a DMRS port 7 of which SCID=1 within one RB shows lower performance of channel estimation than the case of using DMRS ports 7 and 8 which SCID=0 within one RB. In this sense, the method of increasing the number of SCIDs that can be used for avoiding collision of DMRS ports is not a preferable way of solving the situation. Alternatively, to prevent collision of DMRS ports, the DMRS ports may be allocated by dividing them to individual UEs.

In other words, the DMRS port used for decoding the e-PDCCH has to be allocated differently for each UE or each node. For example, at the time of decoding the e-PDCCH, the UE may use the first DMRS port or the DMRS port having the lowest or the highest index from among the DMRS ports allocated to the UE. However, even if each UE decodes the e-PDCCH by using one DMRS port, the e-PDCCH should not be allocated to resource elements used by all of the DMRS ports in order to avoid collision among the UEs connected to a neighboring node or MU-MIMO paired UEs in the same node. For example, when the e-PDCCH is allocated to a first slot of an arbitrary RB, the e-PDCCH or PDSCH is not allocated to 12 resource elements to which DMRS ports maybe mapped within the slot.

Except for the resource elements to which DMRS ports used for decoding the PDSCH are mapped, the resource elements used by the remaining DMRS ports may be used for PDSCH transmission according to whether a neighboring node allocates the e-PDCCH or the PDSCH or whether the MU-MIMO paired UE in the same node has the PDSCH. The base station may inform the UE of the information about the above condition. Also, in the same as in the e-PDCCH, the PDSCH may not be allocated to the resource elements used by all of the DMRS ports. For example, if the DMRS ports 7 and 9 are allocated to the UE and the base station transmits the PDSCH of layer 1 through an arbitrary RB, the base station may inform the UE about whether the PDSCH is transmitted in the corresponding RB through the resource elements to which the DMRS port 9 is mapped.

Figure 27:
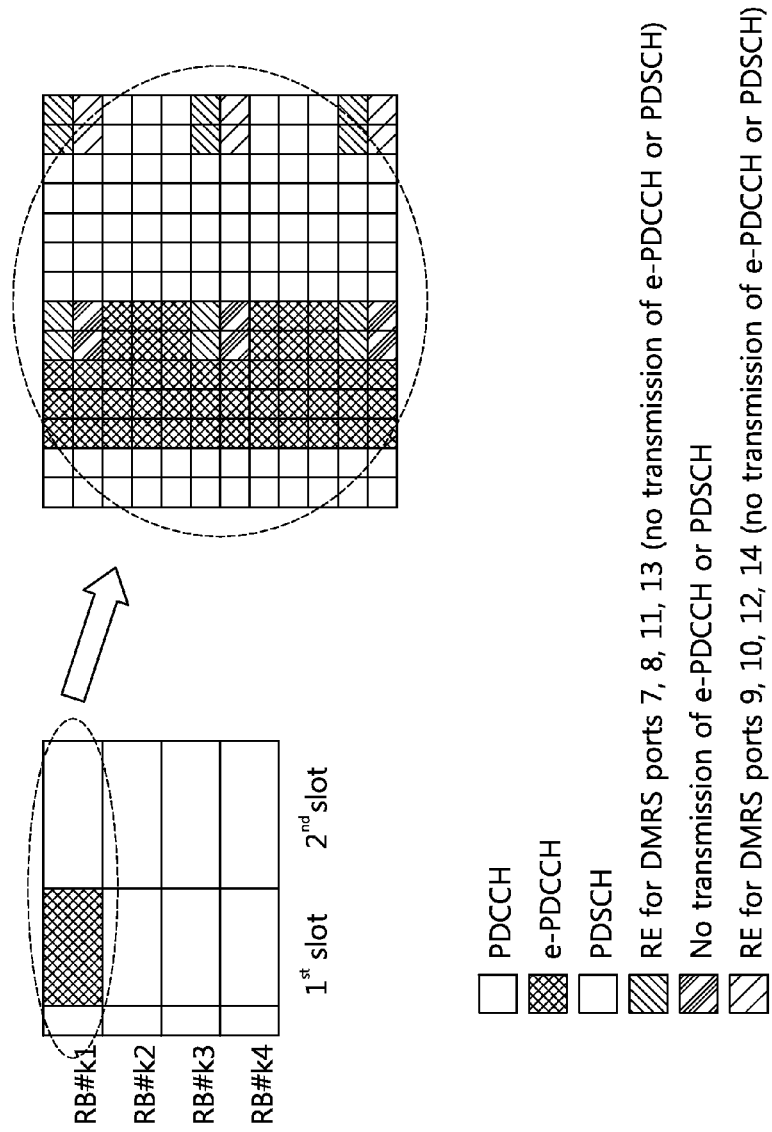
FIG. 27 shows an example whether an e-PDCCH is allocated according to a proposed method for allocating a downlink control channel.

FIG. 27 shows an example whether an e-PDCCH is allocated according to a proposed method for allocating a downlink control channel.

Referring to FIG. 27, the PDSCH is allocated to the RB k1, k2, k3, and k4, and the e-PDCCH is allocated to the region excluding the control region of the first slot of the RB k1. In the first slot to which the e-PDCCH is allocated, the e-PDCCH or PDSCH is not transmitted in the 12 resource elements allocated to DMRS ports. The base station may inform the UE through the e-PDCCH about whether the PDSCH is transmitted through resource elements not used for decoding the PDSCH from among resource elements allocated to the DMRS ports in the second slot. For example, if the DMRS ports 7 and 8 are used for decoding the two-layered PDSCH, the base station may inform the UE about whether the PDSCH is transmitted, through resource elements allocated to the DMRS ports except for the DMRS ports 7 and 8. If all of the DMRS ports are used for decoding the PDSCH, the UE may ignore the corresponding information. Meanwhile, in FIG. 27, CRS, CSI RS, etc., have been omitted for the sake of convenience.

Figure 28:
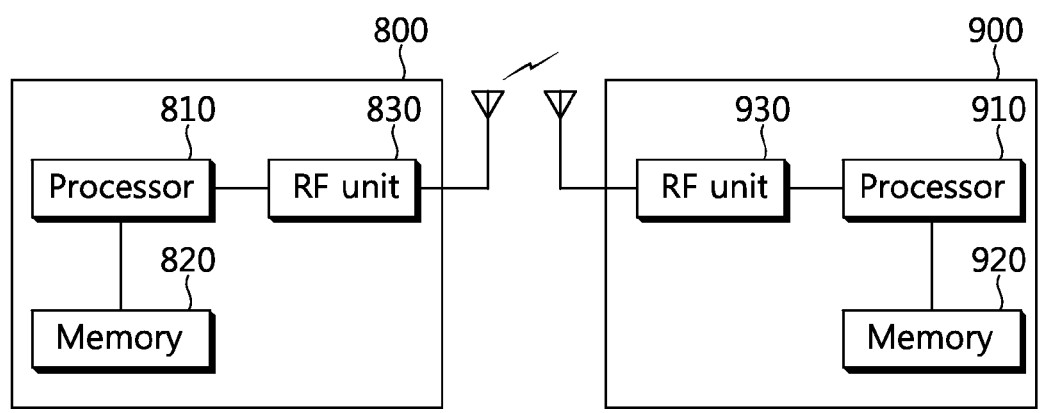
FIG. 28 is a block diagram showing wireless communication system to implement an embodiment of the present invention.

FIG. 28 is a block diagram showing wireless communication system to implement an embodiment of the present invention.

A BS 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for allocating, by a base station, a downlink control channel in a wireless communication system, the method comprising:
    allocating an enhanced physical downlink control channel (e-PDCCH) to a first slot in a subframe; and
    allocating a demodulation reference signal (DMRS) for the e-PDCCH to a second slot of a previous subframe and transmitting the allocated DMRS.

2. The method of claim 1, further comprising:
    allocating a PDSCH to the second slot of the previous subframe.

3. The method of claim 1, wherein the DMRS allocated on the first slot is allocated to the last two orthogonal frequency division multiplexing (OFDM) symbols of the one slot.

4. A method for allocating, by a base station, an antenna port in a wireless communication system, the method comprising:
    allocating an enhanced physical downlink control channel (e-PDCCH) to a data region in a first slot of a first resource block (RB) and a data region in a second slot of a second RB;
    allocating a first antenna port and a second antenna port for transmission of the e-PDCCH; and
    transmitting the allocated e-PDCCH to the UE through the first antenna port and the second antenna port,
    wherein the second RB occupies a different frequency region from a frequency region of the first RB, and
    wherein the first antenna port is allocated at the first RB and the second antenna port is allocated at the second RB.

5. The method of claim 4, wherein the first antenna port is different from the second antenna port.

6. The method of claim 4, further comprising:
    transmitting a demodulation reference signal (DMRS) for decoding the e-PDCCH in a second slot of the first RB through the first antenna port.

7. The method of claim 4, wherein the e-PDCCH is allocated to the first slot and a second slot of the first RB.

8. The method of claim 4, wherein the first antenna port and the second antenna port are pre-determined or informed to the UE through a higher layer.

9. A method for receiving, by a user equipment (UE), a downlink control channel in a wireless communication system, the method comprising:
    allocating an enhanced physical downlink control channel (e-PDCCH) to a data region in a first slot of a first resource block (RB) and a data region in a second slot of a second RB; and
    receiving the e-PDCCH and a demodulation reference signal (DMRS) through a first antenna port and a second antenna port which are allocated by a base station, wherein the second RB occupies a different frequency region from a frequency region of the first RB, and wherein the first antenna port is allocated at the first RB and the second antenna port is allocated at the second RB.

10. The method of claim 9, wherein the first antenna port is different from the second antenna port.

11. The method of claim 9, wherein the e-PDCCH is allocated to the first slot and a second slot of the first RB.

12. The method of claim 9, wherein the first antenna port and the second antenna port are selected by a base station among a plurality of antenna ports allocated by the base station.

\* \* \* \* \*